United States Patent
Kozlowski et al.

(10) Patent No.: US 11,096,229 B1
(45) Date of Patent: Aug. 17, 2021

(54) ENDPOINT COMPUTING DEVICE DYNAMIC NETWORK SLICE UTILIZATION SYSTEM

(71) Applicant: Dell Products L.P., Round Rock, TX (US)

(72) Inventors: Joseph Kozlowski, Hutto, TX (US); Anantha Boyapalle, Cedar Park, TX (US); Carlton Andrews, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 60 days.

(21) Appl. No.: 16/776,305

(22) Filed: Jan. 29, 2020

(51) Int. Cl.
 *H04W 76/15* (2018.01)
 *H04W 28/26* (2009.01)
 *H04W 16/02* (2009.01)

(52) U.S. Cl.
 CPC ........... *H04W 76/15* (2018.02); *H04W 16/02* (2013.01); *H04W 28/26* (2013.01)

(58) Field of Classification Search
 CPC ..... H04W 76/15; H04W 16/02; H04W 28/26; H04W 84/06; H04B 7/18528; H04B 7/18571; H04B 7/18576
 See application file for complete search history.

(56) References Cited

U.S. PATENT DOCUMENTS

| 2014/0369329 | A1  | 12/2014 | Lee et al.   |          |
|--------------|-----|---------|--------------|----------|
| 2017/0054595 | A1  | 2/2017  | Zhang et al. |          |
| 2019/0058997 | A1* | 2/2019  | Futaki       | H04W 76/27 |

OTHER PUBLICATIONS

Yousaf, Faqir Zarrar, et al. "Network slicing with flexible mobility and QoS/QoE support for 5G Networks." 2017 IEEE International Conference on Communications Workshops (ICC Workshops). IEEE, 2017. (Year: 2017).*

* cited by examiner

*Primary Examiner* — Sharad Rampuria
(74) *Attorney, Agent, or Firm* — Haynes and Boone, LLP

(57) ABSTRACT

An endpoint computing device dynamic network slice utilization system includes a core network system that is coupled to a RAN system and that is configured to allocate network slices and make them available for use in wireless communications via the RAN system. An endpoint computing device that includes an application operates to determine changing networking connectivity requirement for the application and/or the changing network characteristics of network slices during an application session, identify different network slices with networking characteristics that satisfy the changing networking connectivity requirements for the application, establish connection(s) for the application with those network slices, and exchange communications via the RAN system and the core network system for the application during the application session using the respective connection(s) established for the application with the respective network slices as the networking connectivity requirement for the application changes.

17 Claims, 12 Drawing Sheets

ENDPOINT COMPUTING DEVICE DYNAMIC NETWORK SLICE UTILIZATION SYSTEM

BACKGROUND

The present disclosure relates generally to information handling systems, and more particularly to dynamic utilization of network slices by information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, laptop/notebook computing devices, tablet computing devices, mobile phones, Internet of Things (IoT) computing devices, and/or other endpoint computing devices known in the art, often utilize wireless networks in order to enable mobility of those endpoint computing devices while exchanging data, as well as to exchange data from remote locations. Wireless networking technology has begun to transition from 4G millimeter wave (4G) wireless technology to 5G millimeter wave (5G) wireless technology. Current conventional 5G wireless technology includes a 5G core network system that is operated by a wireless provider (e.g., AT&T® Mobility of Atlanta, Ga., United States; SPRINT® Corporation of Overland Park, Kans., United States; VERIZON® Wireless of New York, N.Y., United States; etc.), and that operates with a 5G Radio Access Network (RAN) system that includes cellular tower systems that operate to exchange wireless communications for the endpoint computing devices discussed above.

One technique for exchanging the wireless communications by the 5G core network system for the computing devices discussed above includes the use of network slicing, which one of skill in the art will recognize is a network architecture that enables the multiplexing of virtualized and independent logical networks on the same physical network infrastructure, with each network slice providing a network (e.g., a portion of the wireless spectrum available from the 5G core network system) with a particular networking characteristics via the 5G RAN to any of the endpoint computing devices. The 5G specification defines network slicing to enable the scaling of the 5G core network system infrastructure to computing devices having particular connectivity metrics, and tends to work well for "single-function" computing devices such as the IoT computing devices (e.g., IoT power meter devices) discussed above, autonomous driving computing device, factory automation computing devices, and/or other single-function endpoint computing devices known in the art.

For example, such single-function endpoint computing devices tend to require a particular networking connectivity requirement (e.g., a low bandwidth, low latency networking connectivity requirement for an IoT power meter device) for their provided functionality, and thus a network slice may be allocated at the 5G core network system and provided via the 5G RAN system to single-function endpoint computing devices with networking connectivity requirements that may be satisfied by the networking characteristics of that network slice. However, general purpose endpoint computing devices such as the laptop/notebook computing devices, tablet computing devices, and mobile phones discussed above provide multiple functions (e.g., via multiple applications or workloads operating on those general purpose endpoint computing devices), and thus the conventional provisioning of a network slice with particular networking characteristics that satisfy a particular networking connectivity requirement to such general purpose endpoint computing devices will often result in a networking connection that is non-optimal for at least some of the functionality provided by the general purpose endpoint computing device (e.g., at least some of the applications or workloads operating on the general purpose endpoint computing device.) U.S. patent application Ser. No. 16/775,602, filed on Jan. 29, 2020, which includes a common inventor with the present application, and the disclosure of which is incorporated herein by reference, describes an endpoint computing device multi-network slice utilization system that describes endpoint computing devices that may utilize a respective network slice for each of a plurality of different applications, workloads, and/or other functionality provided by the endpoint computing device, thus addressing some of the issues associated with the conventional network slice utilization systems discussed above.

However, some applications may be associated with changing networking requirements, while networking characteristics of network slices such as Quality of Service (QoS) and/or bandwidth may change as that network slice is utilized by the application, and a network administrator may be unaware (or have limited awareness) of such changing application networking connectivity requirements and network slice networking characteristics. As such, conventional endpoint computing device network slice utilization systems and/or the endpoint computing device multi-network slice utilization system discussed above may provide for the utilization of a network slice(s) by an endpoint computing device and/or its applications that can result in mediocre performance of the applications on that endpoint computing device due to the changing networking requirements of those applications and/or the changing characteristics of that network slice, which can compromise user productivity.

Accordingly, it would be desirable to provide an endpoint computing device network slice utilization system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a network slice engine that is configured to: determine a first networking connectivity requirement for an application during an application session; identify a first network slice that is included in a plurality of network slices that are allocated by a core network system, that is available via a Radio Access Network (RAN) system, and that satisfies the first networking connectivity requirement for the application; establish a first connection for the application with the first network slice; exchange communications via the RAN system and the core network system for the application during the application session using the first connection established for the application with the first network slice; determine a second networking connectivity requirement for the application during the application session that is different than the first networking connectivity requirement; identify a second network slice that is included in the plurality of network slices that are allocated by the core network system, that is available via the RAN system, and that satisfies the second networking connectivity requirement for the application; establish a second connection for the application with the second network slice; and exchange communications via the RAN system and the core network system for the application during the application session using the second connection established for the application with the second network slice.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
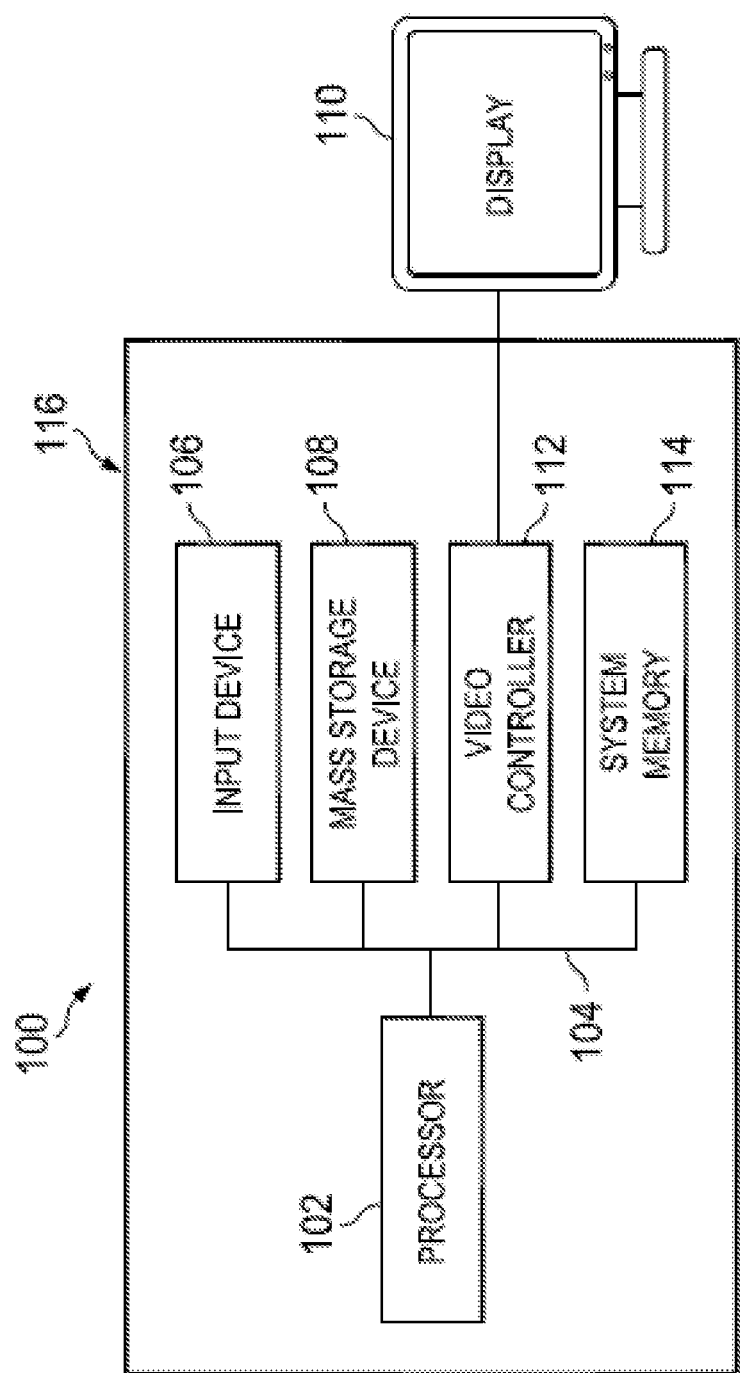
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
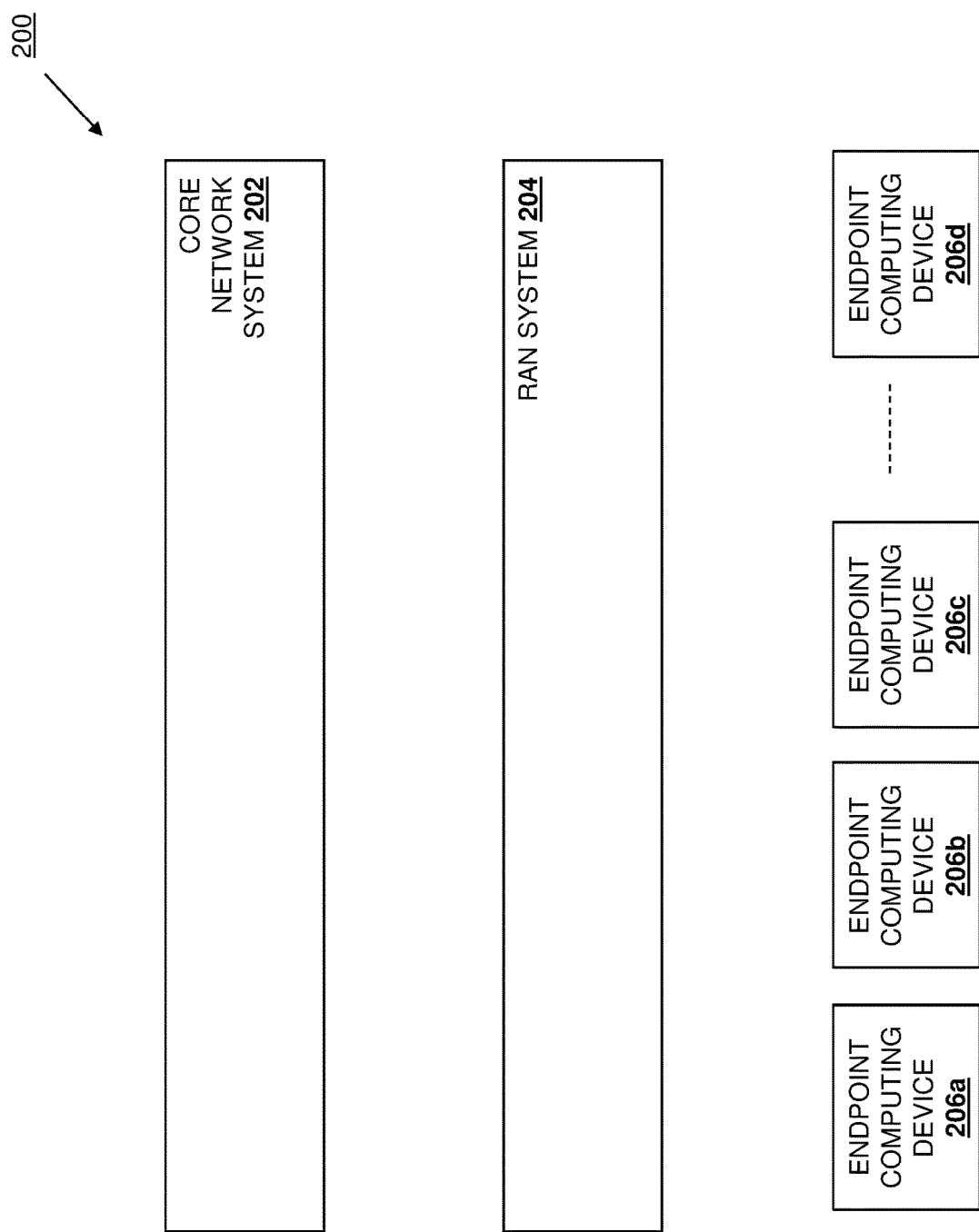
FIG. 2 is a schematic view illustrating an embodiment of an endpoint computing device dynamic network slice utilization system.

Referring now to FIG. 2, an embodiment of an endpoint computing device dynamic network slice utilization system 200 is illustrated. In the illustrated embodiment, the endpoint computing device dynamic network slice utilization system 200 incudes a core network system 202. In an embodiment, the core network system 202 may be provided by the IHS 100 discussed above with reference to FIG. 1, and/or may include some or all of the components of the IHS 100, and in specific examples may include server devices, switch devices, storage devices, and/or other core network system components connected together to provide a 5G core network system that may be operated by a wireless provider (e.g., AT&T® Mobility of Atlanta, Ga., United States; SPRINT® Corporation of Overland Park, Kans., United States; VERIZON® Wireless of New York, N.Y., United States; etc.) and may include any combination of physical and/or virtual components that are configured to provide 5G wireless communications. However, while illustrated and discussed as physical and/or virtual components that provide 5G wireless communications, one of skill in the art in possession of the present disclosure will recognize that other components and/or component configurations may be utilized in a core network system to provide other wireless communications capabilities (e.g., 4G wireless communications) while remaining within the scope of the present disclosure as well.

In the illustrated embodiment, the endpoint computing device dynamic network slice utilization system 200 also includes a Radio Access Network (RAN) system 204. In an embodiment, the RAN system 204 may be provided by the IHS 100 discussed above with reference to FIG. 1, and/or may include some or all of the components of the IHS 100, and may include radio/cellular towers, base stations, antennas, core network interface devices, and/or any other RAN subsystems that would be apparent to one of skill in the art in possession of the present disclosure. In a specific example, the RAN system 204 may be a 5G RAN system including cellular towers that are configured to provide for wireless communications by endpoint computing devices utilizing network slices/spectrum allocated by the 5G core network system discussed above. For example, the RAN system 204 may provide an orchestration layer for wireless communications between communication devices and cellular towers, allowing wireless communications to then be exchanged by a RAN controller in the RAN system 204 via a Software Defined Networking (SDN) switch device and a separate control-based interface, the separation of which allows the RAN system 204 to be flexible and accommodate Network Function Virtualization (NFV) techniques utilized in 5G communications. Furthermore, the endpoint computing device dynamic network slice utilization system 200 also include a plurality of endpoint computing devices 206a, 206b, 206c, and up to 206d, each of which may be provided by the IHS 100 discussed above with reference to FIG. 1, and/or may include some or all of the components of the IHS 100. In a specific example, the endpoint computing devices 206a-206d may be provided by mobile phones, tablet computing devices, laptop/notebook computing devices, IoT computing devices, and/or any other endpoint computing devices that would be apparent to one of skill in the art in possession of the present disclosure. However, while a specific endpoint computing device dynamic network slice utilization system 200 has been illustrated and described, one of skill in the art in possession of the present disclosure will recognize that the endpoint computing device dynamic network slice utilization system of the present disclosure may include a variety of components and component configurations while remaining within the scope of the present disclosure as well.

Figure 3:
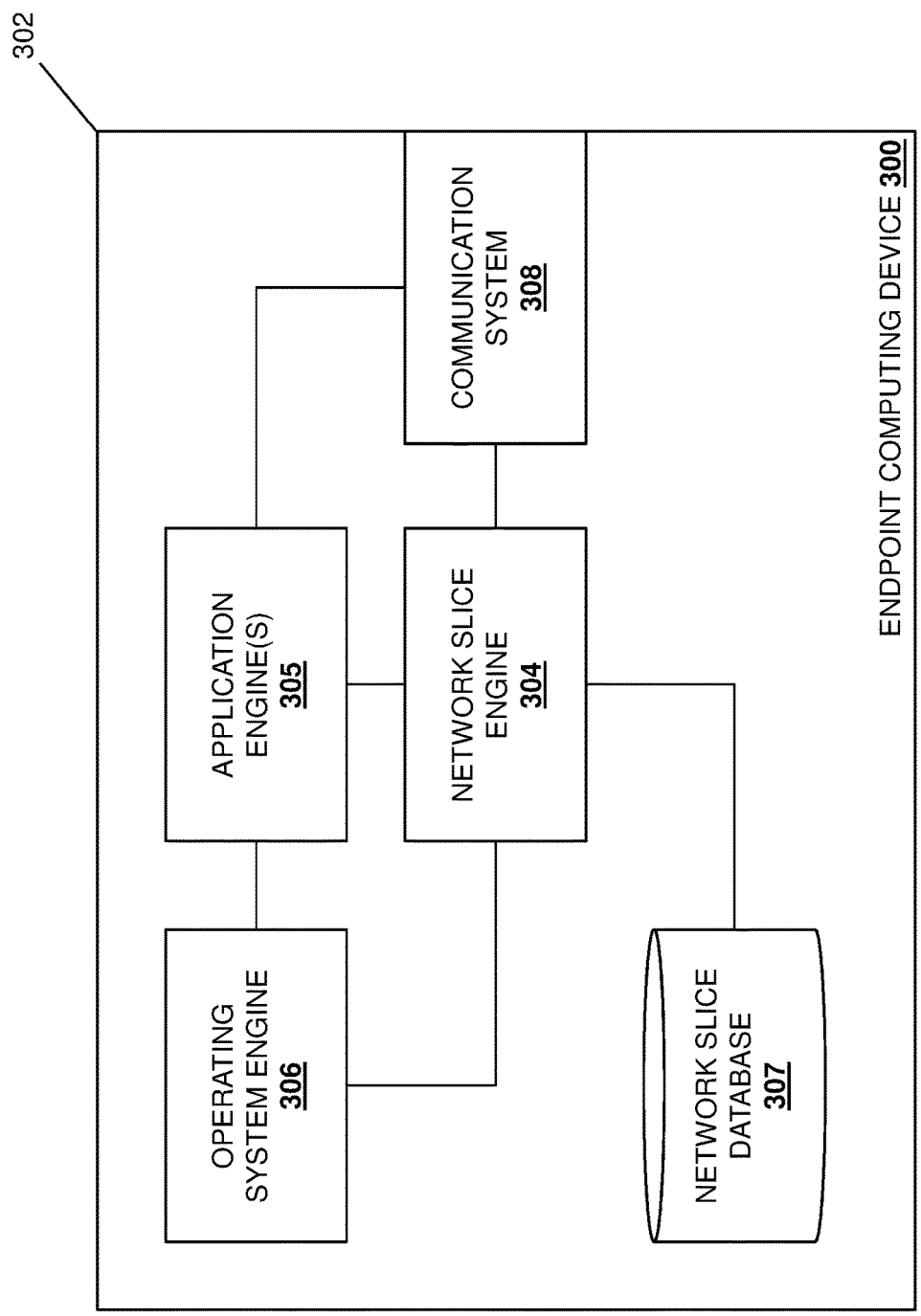
FIG. 3 is a schematic view illustrating an embodiment of an endpoint computing device that may be provided in the endpoint computing device dynamic network slice utilization system of FIG. 2.

Referring now to FIG. 3, an embodiment of an endpoint computing device 300 is illustrated that may provide any or all of the endpoint computing devices 206a-206d discussed above with reference to FIG. 2. As such, the endpoint computing device 300 may be provided by the IHS 100 discussed above with reference to FIG. 1 and/or may include some or all of the components of the IHS 100, and in specific examples may be provided by mobile phones, tablet computing devices, laptop/notebook computing devices, IoT computing devices, and/or any other endpoint computing devices that would be apparent to one of skill in the art in possession of the present disclosure. Furthermore, while illustrated and discussed as an endpoint computing device 300, one of skill in the art in possession of the present disclosure will recognize that the functionality of the endpoint computing device 300 discussed below may be provided by other devices that are configured to operate similarly as the endpoint computing device 300 discussed below.

In the illustrated embodiment, the endpoint computing device 300 includes a chassis 302 that houses the components of the endpoint computing device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a network slice engine 304 that is configured to perform the functionality of the network slice engines and/or endpoint computing devices discussed below. Furthermore, the memory system may also include instructions that, when executed by the processing system, cause the processing system to provide an application engine 305 that is configured to provide any or all of the applications discussed below as operating on the endpoint computing device 300. Further still, the memory system may also include instructions that, when executed by the processing system, cause the processing system to provide an operating system engine 306 that is configured to perform the functionality of the operating system engines and/or endpoint computing devices discussed below.

The chassis 302 may also house a storage system (not illustrated, but which may include the storage 108 discussed above with reference to FIG. 1) that is coupled to the network slice engine 304 (e.g., via a coupling between the storage system and the processing system) and that includes a network slice database 307 that is configured to store any of the information utilized by the network slice engine 304 discussed below. The chassis 302 may also house a communication system 308 that is coupled to the network slice engine 304 and the application engine 305 (e.g., via a coupling between the communication system 308 and the processing system) and that may be provided by a Network Interface Controller (NIC), wireless communication systems (e.g., cellular wireless components (e.g., 5G cellular wireless components), BLUETOOTH® components, Near Field Communication (NFC) components, WiFi components, etc.), and/or any other communication components that would be apparent to one of skill in the art in possession of the present disclosure. However, while a specific endpoint computing device 300 has been illustrated, one of skill in the art in possession of the present disclosure will recognize that endpoint computing devices (or other devices operating according to the teachings of the present disclosure in a manner similar to that described below for the endpoint computing device 300) may include a variety of components and/or component configurations for providing conventional endpoint computing device functionality, as well as the functionality discussed below, while remaining within the scope of the present disclosure as well.

Figure 4:
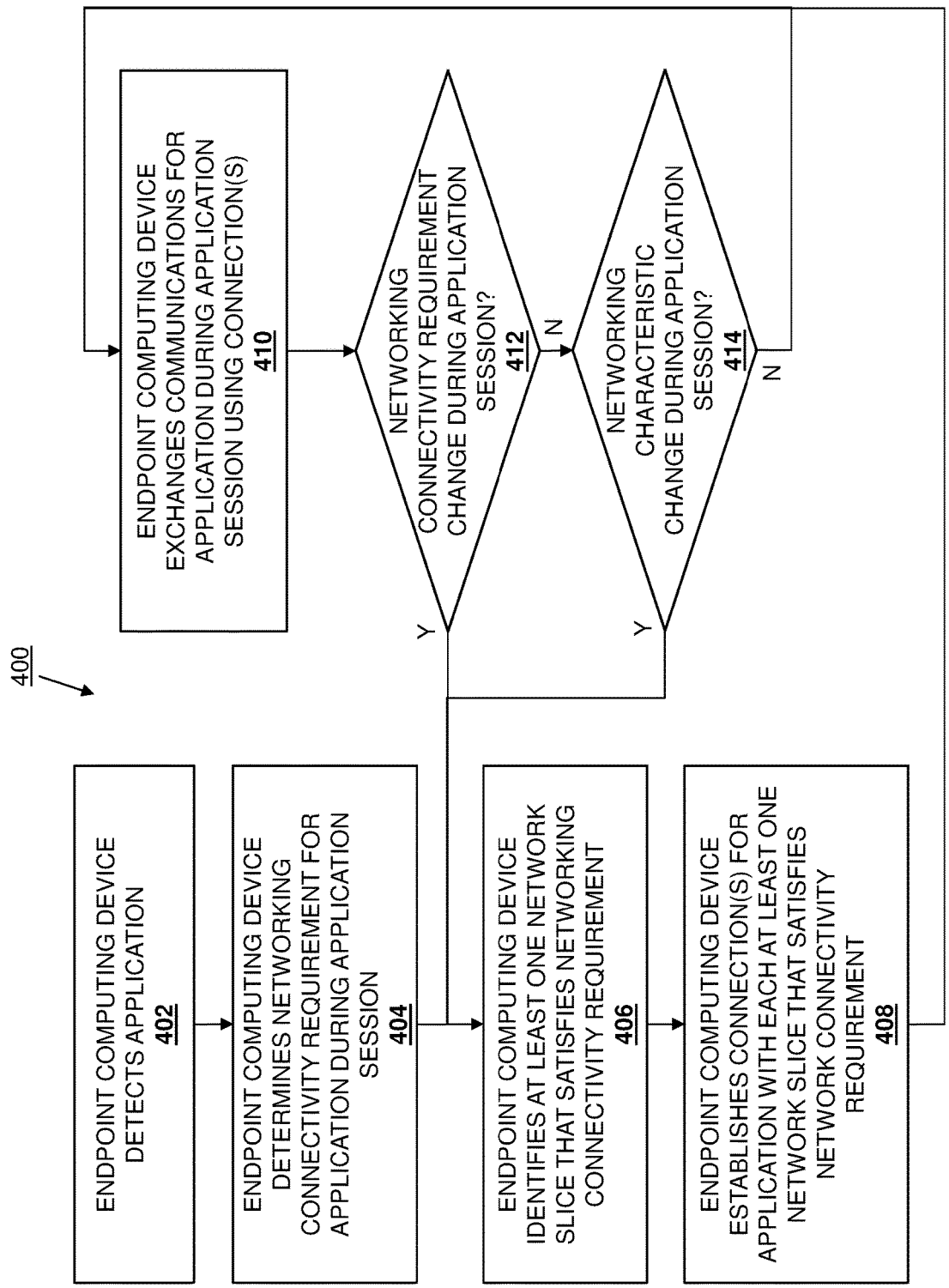
FIG. 4 is a flow chart illustrating an embodiment of a method for dynamic utilization of network slices by an endpoint computing device.

Referring now to FIG. 4, an embodiment of a method 400 for dynamic utilization of network slices by an endpoint computing device is illustrated. As discussed below, the systems and methods of the present disclosure provide for the dynamic utilization of a plurality of network slices by any particular functionality (e.g., any particular application, workload, etc.) provided on any particular endpoint computing device. For example, a core network system that is coupled to a RAN system may allocate a plurality of a network slices and make each of the plurality of network slices available for use in wireless communications via the RAN system. An endpoint computing device with an application operating on that endpoint computing device may determine a first networking connectivity requirement for the application during an application session, identify a first network slice that is included in the plurality of network slices and that satisfies the first networking connectivity requirement for the application, establish a first connection for the application with the first network slice, and exchange communications via the RAN system and the core network system for the application during the application session using the first connection established for the application with the first network slice. Subsequently, the endpoint computing device may determine a second networking connectivity requirement for the application during the application session that is different than the first networking connectivity requirement, identify a second network slice that is included in the plurality of network slices and that satisfies the second networking connectivity requirement for the application, establish a second connection for the application with the second network slice, and exchange communications via the RAN system and the core network system for the application during the application session using the second connection established for the application with the second network slice. As such, any particular application, workload, or other functionality operating on a computing device may dynamically utilize a plurality of network slices as the networking requirements of that application, workload, or other functionality changes, and/or as the networking characteristics of network slice(s) being utilized by that application, workload, or other functionality changes.

Figure 5:
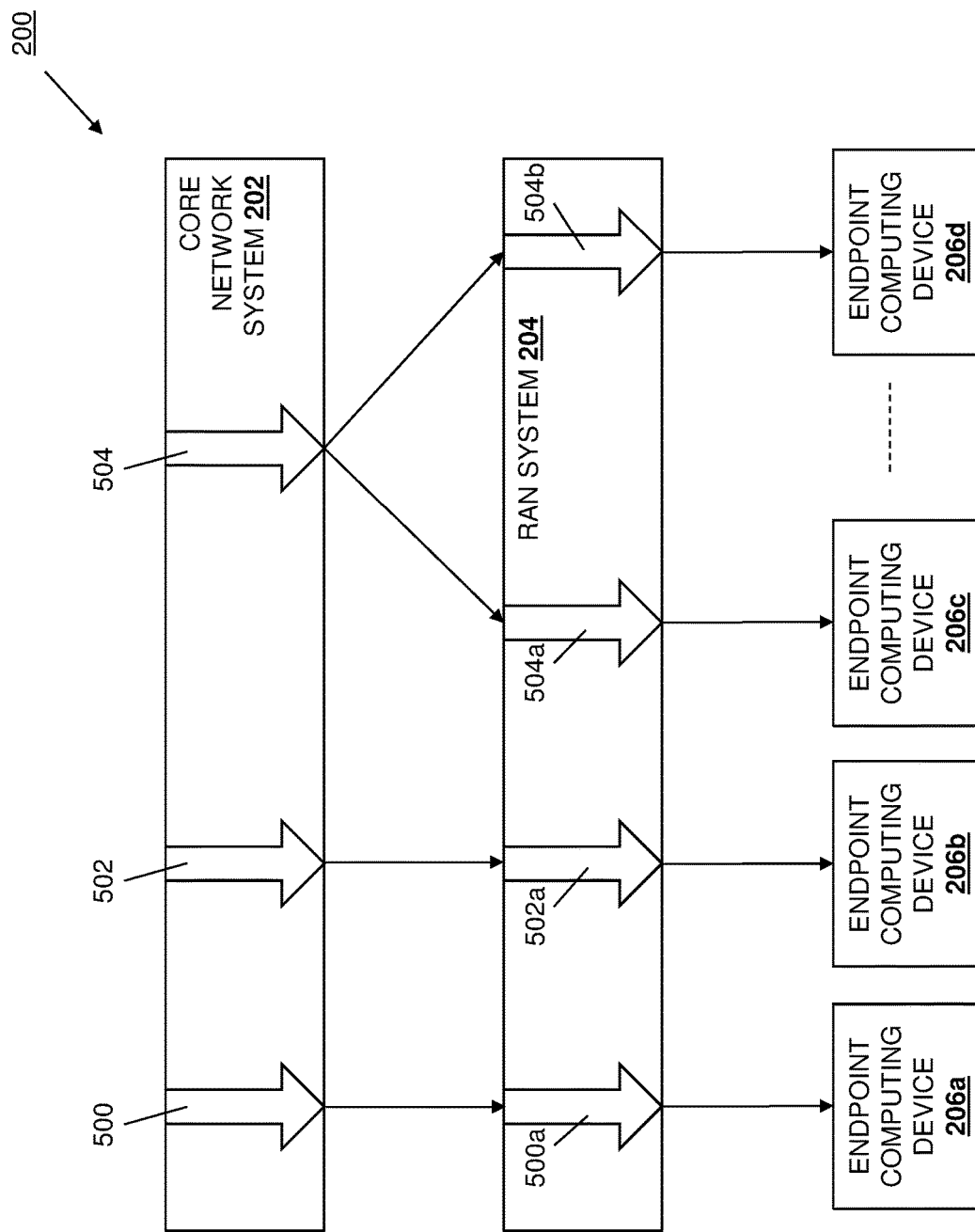
FIG. 5 is a schematic view illustrating an embodiment of a conventional endpoint computing device network slice utilization system.

With reference to FIG. 5, an embodiment of conventional endpoint computing device network slicing functionality using the endpoint computing device dynamic network slice utilization system 200 of FIG. 2 is illustrated for purposes of discussion and to contrast the endpoint computing device dynamic network slice utilization functionality of the present disclosure. As illustrated in FIG. 5, the core network system 202 (e.g., a 5G core network system) may operate to allocate network slices and make those network slices available via the RAN system 204 (e.g., a 5G RAN system) for use in wireless communications. For example, arrows are provided within the core network system 202 in FIG. 5 to represent portions of spectrum that are available to the core network system 202, including a spectrum portion 500, a spectrum portion 502, and a spectrum portion 504 in the illustrated embodiment.

Furthermore, the allocation of network slices and the making of those network slices available via the RAN system 204 for use in wireless communications by the core network system 202 is illustrated in FIG. 5 by arrows provided in the RAN system 204, and may include the core network system 202 allocating a network slice 500a from the spectrum portion 500 (as illustrated by the arrow between the spectrum portion 500 and the network slice 500a), allocating a network slice 502a from the spectrum portion 502 (as illustrated by the arrow between the spectrum portion 502 and the network slice 502a), and allocating network slices 504a and 504b from the spectrum portion 504 (as illustrated by the respective arrow between the spectrum portion 504 and the network slices 504a and 504b). One of skill in the art in possession of the present disclosure would recognize that the allocation of network slices by a core network system, and the making of those network slices available by the core network system via a RAN system, may include a variety of conventional operations, and thus is not described herein in detail. Furthermore, one of skill in the art in possession of the present disclosure will appreciate that each network slice 500a, 502a, 504a, and 504b may provide networking characteristics including data transmission latency, data transmission throughput/bandwidth, data transmission reliability, other Quality of Service (QoS) characteristics, and/or other networking characteristics that would be apparent to one of skill in the art in possession of the present disclosure, and any of those networking characteristics may change over time and, in particular, during the use of those network slices for wireless communications.

As also illustrated in FIG. 5, each of the endpoint computing devices 206a-206d may then operate to connect to a respective network slice in order to utilize that network slice for exchanging wireless communications via the RAN system 204 and the core network system 202 (i.e., wireless communications with other endpoint computing devices coupled to the RAN system 204, other endpoint devices coupled to a network that is coupled to the core network system 202, etc.) One of skill in the art in possession of the present disclosure would recognize that the connection to a network slice by an endpoint computing device, and the exchange of communications via a RAN system and core network system by that endpoint computing device using that network slice, may include a variety of conventional operations, and thus is not described herein in detail. As discussed above, the conventional endpoint computing device network slicing illustrated in FIG. 5 and described above tends to work well for "single-function" computing devices such as IoT computing devices (e.g., IoT power meter devices), autonomous driving computing device, factory automation computing devices, and/or other single-function endpoint computing devices known in the art that include particular networking connectivity requirements that are satisfied by the networking characteristics of the network slice to which that endpoint computing device is connected.

However, the conventional endpoint computing device network slicing illustrated in FIG. 5 and described above introduces inefficiencies when utilized with general purpose endpoint computing devices such as laptop/notebook computing devices, tablet computing devices, and mobile phones that provide multiple functions (e.g., via multiple applications operating on those general purpose endpoint computing devices), as the conventional provisioning of a conventional network slice with networking characteristics that satisfy a particular networking connectivity requirement to such general purpose endpoint computing devices will often result in a networking connection that is non-optimal for at least some of the functionality provided by the general purpose endpoint computing device (e.g., at least some of the applications or workloads operating on the general purpose endpoint computing device.) As discussed above, U.S. patent application Ser. No. 16/775,602, filed on Jan. 29, 2020, which includes a common inventor with the present application, and the disclosure of which is incorporated herein by reference, describes an endpoint computing device multi-network slice utilization system that includes endpoint computing devices that may utilize a respective network slice for each of a plurality of different applications, workloads, and/or other functionality provided by the endpoint computing device.

As described in that application, any particular endpoint device in the endpoint computing device multi-network slice utilization system may establish a respective connection to each of the network slices 500*a*, 502*a*, 504*a*, and 504*b* for each particular application, workload, or other functionality operating on that endpoint computing device based on the networking characteristics of that network slice satisfying networking connectivity requirements for the corresponding application. As such, the endpoint computing device multi-network slice utilization system provides networking connectivity via a respective network slice for each application operating on an endpoint computing device on a per-application/per-workload/per functionality basis. However, the static establishment of respective connections to respective network slices for each application operating on an endpoint computing device in the endpoint computing device multi-network slice utilization system has been found to raise some issues, as changing networking connectivity requirements for an application during an application session, and/or changing networking characteristics for a network slice utilized by an application during an application session, can result in mediocre performance of that application during the application session in the event that, for example, the networking connectivity requirements for an application exceed the capabilities of the networking characteristics of the network slice to which it is connected during the application session.

The method 400 begins at block 402 where an endpoint computing device detects an application. In the specific example provided below, the method 400 is described as being performed by the endpoint computing device 206*a*. However, one of skill in the art in possession of the present disclosure will appreciate that the method 400 may be performed by any or all of the endpoint computing devices 206*a*-206*d* at the same (or different) times while remaining within the scope of the present disclosure as well. In an embodiment, at block 402, the application engine(s) 305 in the endpoint computing device 206*a*/300 may operate to provide one or more applications for operation on the endpoint computing device 206*a*/300. For example, at block 402, the application engine(s) 305 in the endpoint computing device 206*a*/300 may operate to provide a video communication application, an audio communication application, a video streaming application, an office productivity application, a gaming application, or any other applications that would be apparent to one of skill in the art in possession of the present disclosure. As would be appreciated by one of skill in the art in possession of the present disclosure, the applications provided at block 402 may operate to provide (or be replaced by) workloads operating on the endpoint computing device(s), as well as any other endpoint computing device functionality that one of skill in the art in possession of the present disclosure would recognize that benefitting from the dedicated network slices functionality described below.

As such, in an embodiment of block 402, the network slice engine 304 in the endpoint computing device 206*a*/300 may operate to detect an application provided by the application engine(s) 305. For example, at block 402, the network slice engine 304 in the endpoint computing device 206*a*/300 may detect the application provided by the application engine(s) 305 and operating on the endpoint computing device 206*a*/300 in response to the launching of that application, in response to a network connection request received from that application, and/or in response to any other application detection event that would be apparent to one of skill in the art in possession of the present disclosure. As such, continuing with the specific example provided above, at block 402, the network slice engine 304 in the endpoint computing device 206*a*/300 may detect a video communication application, an audio communication application, a video streaming application, an office productivity application, or a gaming application provided on the endpoint computing device 206*a*/300. However, while the method 400 is described as detecting an application at block 402, one of skill in the art in possession of the present disclosure will appreciate how workloads and/or other functionality provided on the endpoint computing device 206*a*/300 may be detected at block 402 while remaining within the scope of the present disclosure as well.

As will be appreciated by one of skill in the art in possession of the present disclosure, an application detected at block 402 may be associated with an application session during which the application operates substantially continuously with regard to a network connection (i.e., upon establishment of a network connection, the application session may begin, and does not end until network connectivity is lost.) For example, the application for which the dynamic network slice utilization functionality is provided according to the teachings here may never stop operating during an application session due to unavailable network resources, as the dynamic network slice utilization functionality will always operate to dynamically provide at least one network slice for use by that application that includes networking characteristics that satisfy its network connectivity requirements (e.g., by adding, aggregating, and ending connections to network slices as discussed below) until its application session is over. As will be appreciated by one of skill in the art in possession of the present disclosure, the dynamic nature of the network slice provisioning described herein may be abstracted to the application by, for example, providing a Network Interface Controller (NIC) for the application container for that application, and performing the network slice/spectrum connections "behind" the NIC (from the perspective of the application.)

As such, the dynamic network slice utilization functionality discussed below may be performed during a particular application session provided for an application, and may provide for continuous network connectivity via connection(s) to different and/or multiple network slices during that particular application session, as described below. However, while the dynamic network slice utilization functionality of the present disclosure is discussed as being provided during an application session for an application, one of skill in the art in possession of the present disclosure will appreciate that dynamic network slice utilization functionality of the present disclosure may be performed in different manners while remaining within the scope of the present disclosure as well.

The method 400 then proceeds to block 404 where the endpoint computing device determines a networking connectivity requirement for a detected application during an application session. In an embodiment, at block 404, the network slice engine 304 in the endpoint computing device 206*a*/300 may operate to determine an initial networking connectivity requirement for any particular application detected at block 402 that will be required during an application session for that application. As will be understood by one of skill in the art in possession of the present disclosure, while a single application is discussed below, the blocks of the method 400 discussed below may (and often will) be performed for any number of applications operating on the endpoint computing device 206*a*. In an embodiment, the determination of the initial networking connectivity requirement for an application by the network slice engine 304 in the endpoint computing device 206*a*/300 may include the application engine 305, which is providing an application, transmitting the initial networking connectivity requirement for that application to the network slice engine 304 (e.g., as IP header information in a data packet), the network slice engine 304 retrieving the initial networking connectivity requirement for an application (e.g., in response to the detection of that application) that may have been previously determined and stored in the network slice database 306 from the network slice database 306, the network slice engine 304 detecting the initial networking connectivity requirement (e.g., by measuring a bit transfer rate to/from the application), the network slice engine 304 determining an application type (e.g., audio application types, video application types, conferencing application types, etc.) of the application, and/or via any other networking connectivity requirement determination technique that would be apparent to one of skill in the art in possession of the present disclosure.

Continuing with the specific example provided above, at block 404, the network slice engine 304 in the endpoint computing device 206*a*/300 may operate to determine an initial networking connectivity requirement for a video communication application detected at block 402 that includes a relatively high bandwidth networking connectivity requirement, a relatively low latency networking connectivity requirement, and a relatively high reliability networking connectivity requirement. Similarly, at block 404, the network slice engine 304 in the endpoint computing device 206*a*/300 may operate to determine an initial networking connectivity requirement for an audio communication application detected at block 402 that includes a relatively low bandwidth networking connectivity requirement, a relatively low latency networking connectivity requirement, and a relatively high reliability networking connectivity requirement. Similarly, at block 404, the network slice engine 304 in the endpoint computing device 206*a*/300 may operate to determine an initial networking connectivity requirement for a video streaming application detected at block 402 that includes a relatively high bandwidth networking connectivity requirement, a relatively intermediate latency networking connectivity requirement, and a relatively intermediate reliability networking connectivity requirement.

Similarly, at block 404, the network slice engine 304 in the endpoint computing device 206*a*/300 may operate to determine an initial networking connectivity requirement for an office productivity application detected at block 402 that includes a relatively intermediate bandwidth networking connectivity requirement, a relatively low latency networking connectivity requirement, and a relatively low reliability networking connectivity requirement. Similarly, at block 404, the network slice engine 304 in the endpoint computing device 206*a*/300 may operate to determine an initial networking connectivity requirement for a gaming application detected at block 402 that includes a relatively very high bandwidth networking connectivity requirement, a relatively very high latency networking connectivity requirement, and a relatively very high reliability networking connectivity requirement. However, while a few specific examples are provided, one of skill in the art in possession of the present disclosure will appreciate how different applications, workloads, and/or functionalities operating on and/or provided by an endpoint computing devices may include a variety of different initial networking connectivity requirements, and that any of those initial networking connectivity requirements may be determined at block 404 while remaining within the scope of the present disclosure as well.

Furthermore, in different embodiments, any particular application, workload, and/or functionality operating on the endpoint computing device 206*a*/300 may include multiple application subsystems, workload subsystems, and/or functionality subsystems that have different initial networking connectivity requirements (e.g., an application operating on the endpoint computing device 206*a*/300 may include a first application subsystem having a first initial networking connectivity requirement, a second application subsystem having a second initial networking connectivity requirement, and so on), and those applications subsystems, workload subsystems, and/or functionality subsystems may be detected at block 402 and their different initial networking connectivity requirements determined at block 404. Further still, in some embodiments, multiple applications operating on the endpoint computing device 206*a*/300 may include the same initial networking connectivity requirement (or respective initial networking connectivity requirements that fall within a particular networking connectivity requirement range) and, as such, those applications may be detected, the initial networking connectivity requirements of those applications may be determined, and those applications may be grouped in an application container that is associated with the initial networking connectivity requirement (or initial networking connectivity requirement range) of those applications. Yet further still, while the grouping of applications with the same or similar initial networking connectivity requirements into an application container is described as being performed during the method 400, the application containers discussed above as being associated with an initial networking connectivity requirement or an initial networking connectivity requirement range may be determined prior to the method 400, stored in the network slice database 306, and identified at block 404 from that network slice database 306 while remaining within the scope of the present disclosure as well.

Figure 6A:
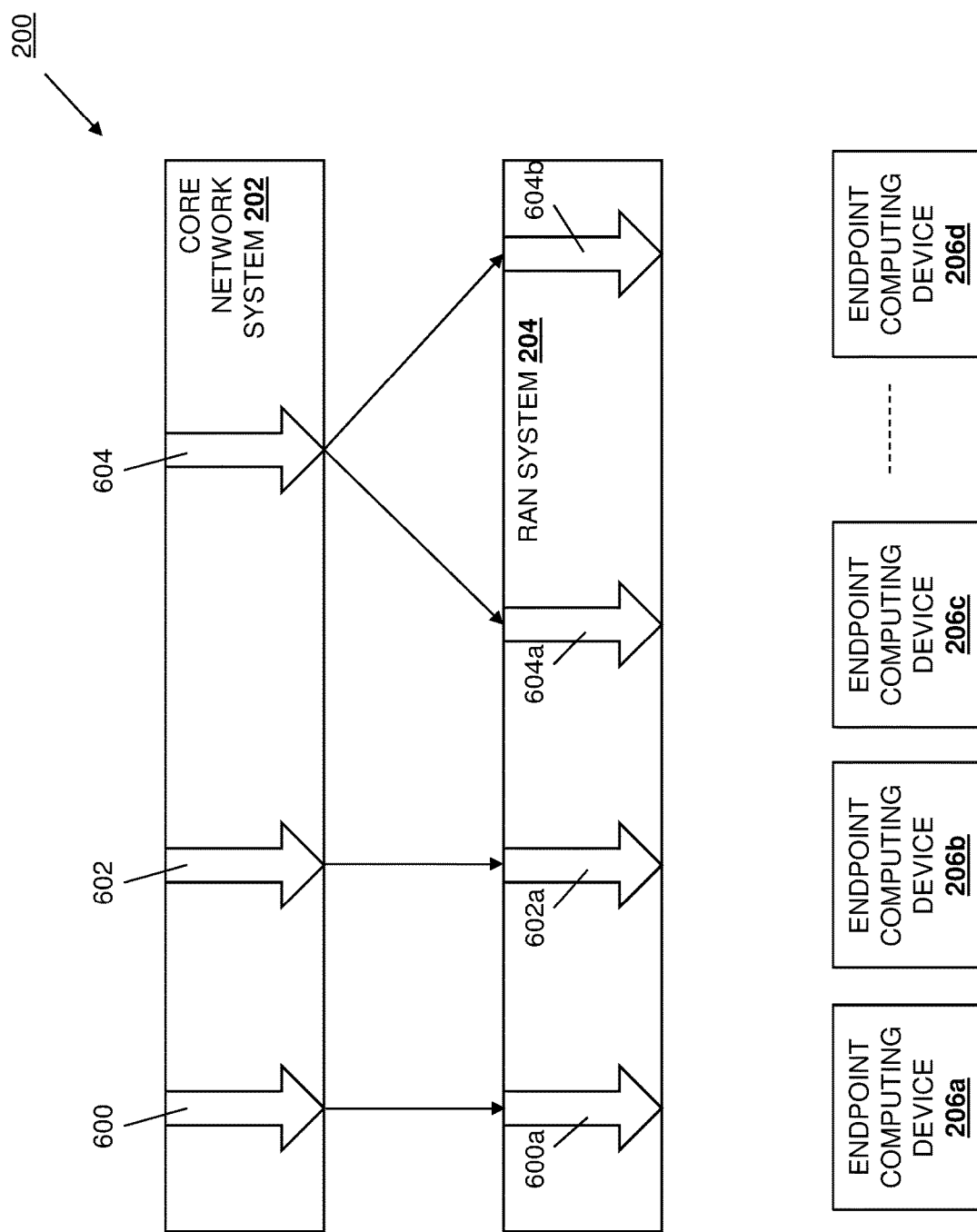
FIG. 6A is a schematic view illustrating an embodiment of the endpoint computing device dynamic network slice utilization system of FIG. 2 operating during the method of FIG. 4.

The method 400 then proceeds to block 406 where the endpoint computing device identifies at least one network slice that satisfy the initial networking connectivity requirement for the detected application. In an embodiment, at block 406, the network slice engine 304 in the endpoint computing device 206*a*/300 may operate to identify at least one network slice that satisfies the networking connectivity requirement determined for the application at block 404. With reference to FIG. 6A, the core network system 202 (e.g., a 5G core network system) may operate to allocate network slices and make those network slices available to via the RAN system 204 (e.g., a 5G RAN system) for use in wireless communications. For example, arrows are provided in the core network system 202 in FIG. 6A to represent portions of spectrum that is available to the core network system 202, including a spectrum portion 600, a spectrum portion 602, and a spectrum portion 604 in the illustrated embodiment.

Figure 6B:
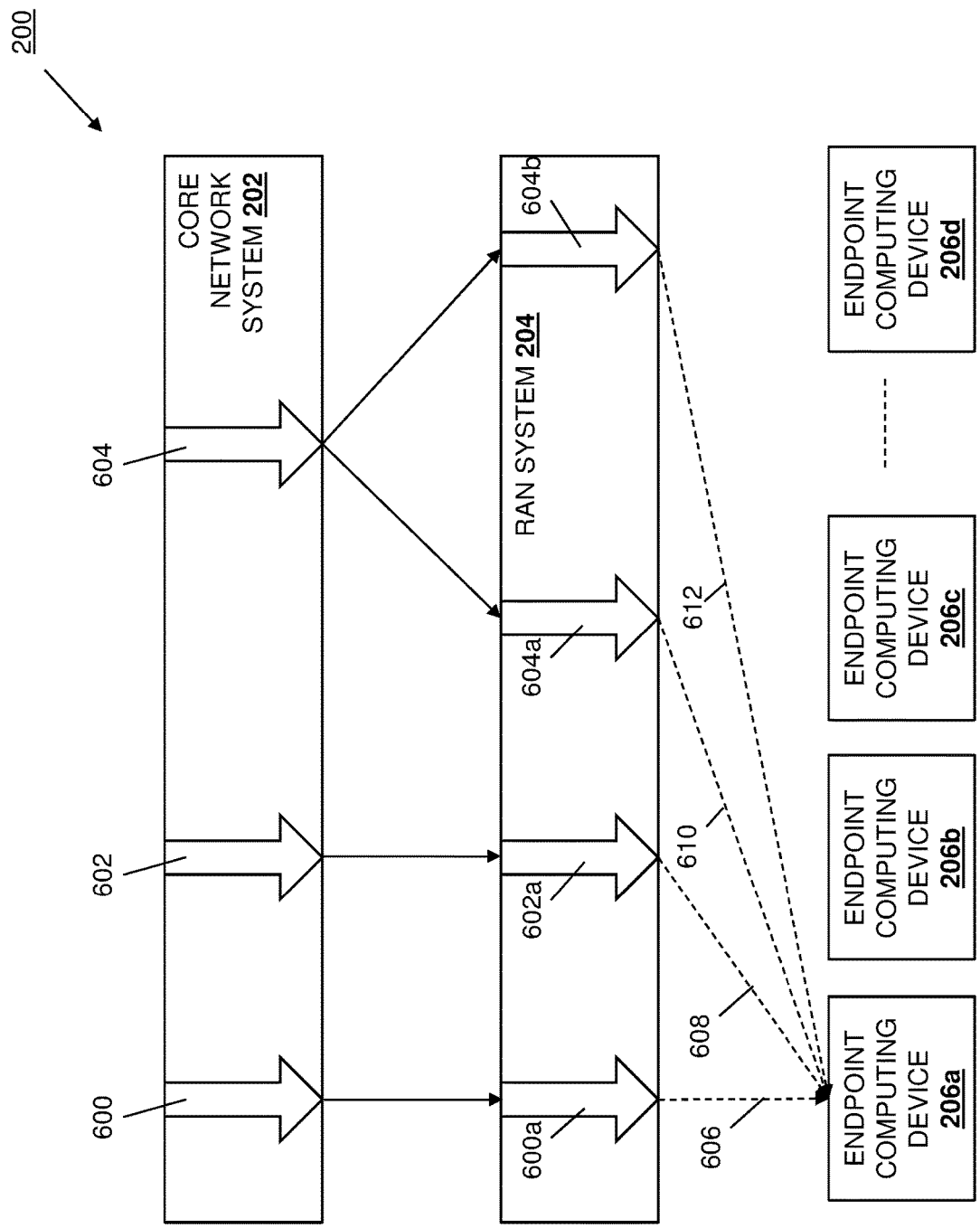
FIG. 6B is a schematic view illustrating an embodiment of the endpoint computing device dynamic network slice utilization system of FIG. 2 operating during the method of FIG. 4.

Furthermore, the allocation of network slices and the making of those network slices available via the RAN system 204 for use in wireless communications by the core network system 202 is illustrated in FIG. 6A by arrows provided in the RAN system 204, and may include the core network system 202 allocating a network slice 600*a* from the spectrum portion 600 (as illustrated by the arrow between the spectrum portion 600 and the network slice 600a), allocating a network slice 602a from the spectrum portion 602 (as illustrated by the arrow between the spectrum portion 602 and the network slice 602a), and allocating network slices 604a and 604b from the spectrum portion 604 (as illustrated by the respective arrow between the spectrum portion 604 and the network slices 604a and 604b). One of skill in the art in possession of the present disclosure would recognize that the allocation of network slices by a core network system, and the making of those network slices available by the core network system via a RAN system, may include a variety of conventional operations, and thus is not described herein in detail. Furthermore, one of skill in the art in possession of the present disclosure will appreciate that each network slice 600a, 602a, 604a, and 604b may provide particular initial networking characteristics including a particular initial data transmission latency, a particular initial data transmission throughput/bandwidth, a particular initial data transmission reliability, other particular initial QoS networking characteristics, and/or other particular initial networking characteristics that would be apparent to one of skill in the art in possession of the present disclosure In some embodiments, each network slice allocated by the core network system 202 and made available via the RAN system 204 by the core network system 202 may be configured to identify the particular initial networking characteristics provided by that network slice. For example, each of the network slices 600a, 602a, 604a, and 604b may be configured to advertise its initial networking characteristics such that the network slice engine 304 in the endpoint computing device 206a/300 may identify the initial networking characteristics of each network slice that is available for connection to the endpoint computing device 206a/300. FIG. 6B illustrates how the network slice 600a may advertise its initial networking characteristics 606 to the endpoint computing device 206a (illustrated via a dashed arrow in FIG. 6B), the network slice 602a may advertise its initial networking characteristics 608 to the endpoint computing device 206a (illustrated via a dashed arrow in FIG. 6B), the network slice 604a may advertise its initial networking characteristics 610 to the endpoint computing device 206a (illustrated via a dashed arrow in FIG. 6B), and the network slice 604b may advertise its initial networking characteristics 610 to the endpoint computing device 206a (illustrated via a dashed arrow in FIG. 6B). One of skill in the art in possession of the present disclosure will appreciate that the dashed arrows in FIG. 6B may indicate the retrieval of the initial networking characteristics 606, 608, 610, and 612 by the network slice engine 304 in the endpoint computing device 206a/300 via the network slice advertisements discussed above. In a specific example, any particular network slice may identify its networking characteristics via a network slice identifier, a network slice name, a network slice data traffic QoS (e.g., default/best effort, video streaming best effort, enterprise high priority, etc.), and/or a code (e.g., 0x00, 0x1A, 0X12, etc.).

As such, at block 406, the network slice engine 304 in the endpoint computing device 206a/300 may identify the initial latency networking characteristics, the initial throughput/bandwidth networking characteristics, the initial reliability networking characteristics, other initial QoS networking characteristics, and/or any other initial networking characteristics provided by each of the network slices 600a, 602a, 604a, and 604b. Furthermore, while a particular technique for identifying networking characteristics of a network slice have been described, one of skill in the art in possession of the present disclosure will appreciate that other techniques for identifying networking characteristics of a network slice may fall within the scope of the present disclosure as well In a specific example, a RAN controller in the RAN system 204 may inform the endpoint computing device about the number of network slices available to that endpoint computing device from the RAN system, and the QoS networking characteristics associated with each network slice, which allows the endpoint computing device to associate the data traffic provided by each application or workload operating on that endpoint computing device with a network slice that satisfies its network connectivity requirements, as discussed below.

Thus, at block 406, the network slice engine 304 in the endpoint computing device 206a/300 may identify a at least one of the network slices 206a-206d that includes initial networking characteristics that satisfy the initial networking connectivity requirement for the application detected at block 402. Continuing with the example provided above, at block 406 the network slice engine 304 in the endpoint computing device 206a/300 may identify at least one of the network slices 600a, 602a, 604a, and 604b that include initial networking characteristics that satisfy the initial networking connectivity requirement for a video communication application detected at block 402 that includes a relatively high bandwidth networking connectivity requirement, a relatively low latency networking connectivity requirement, and a relatively high reliability networking connectivity requirement. Similarly, at block 406 the network slice engine 304 in the endpoint computing device 206a/300 may identify at least one of the network slices 600a, 602a, 604a, and 604b that include initial networking characteristics that satisfy the initial networking connectivity requirement for an audio communication application detected at block 402 that includes a relatively low bandwidth networking connectivity requirement, a relatively low latency networking connectivity requirement, and a relatively high reliability networking connectivity requirements. Similarly, at block 406 the network slice engine 304 in the endpoint computing device 206a/300 may identify at least one of the network slices 600a, 602a, 604a, and 604b that include initial networking characteristics that satisfy the initial networking connectivity requirement for a video streaming application detected at block 402 that includes a relatively high bandwidth networking connectivity requirement, a relatively intermediate latency networking connectivity requirement, and a relatively intermediate reliability networking connectivity requirement.

Similarly, at block 406 the network slice engine 304 in the endpoint computing device 206a/300 may identify at least one of the network slices 600a, 602a, 604a, and 604b that include initial networking characteristics that satisfy the initial networking connectivity requirement for an office productivity application detected at block 402 that includes a relatively intermediate bandwidth networking connectivity requirement, a relatively low latency networking connectivity requirement, and a relatively low reliability networking connectivity requirements. Similarly, at block 406 the network slice engine 304 in the endpoint computing device 206a/300 may identify at least one of the network slices 600a, 602a, 604a, and 604b that include initial networking characteristics that satisfy the initial networking connectivity requirement for a gaming application detected at block 402 that includes a relatively very high bandwidth networking connectivity requirement, a relatively very high latency networking connectivity requirement, and a relatively very high reliability networking connectivity requirement.

Furthermore, in some embodiments, at block 406 the network slice engine 304 in the endpoint computing device 206a/300 may identify at least one of the network slices 600a, 602a, 604a, and 604b that include initial networking characteristics that satisfy the initial networking connectivity requirement for any of multiple application subsystems, workload subsystems, and/or functionality subsystems included in an application, workload, or functionality (e.g., one or more network slices including first initial networking characteristics that satisfy a first initial networking connectivity requirement for a first application subsystem included in an application operating on the endpoint computing device 206a/300, one or more network slices including second initial networking characteristics that satisfy a second initial networking connectivity requirement for a second application subsystem included in that application operating on the endpoint computing device 206a/300, and so on). Further still, in some embodiments, at block 406 the network slice engine 304 in the endpoint computing device 206a/300 may identify at least one of the network slices 600a, 602a, 604a, and 604b that include initial networking characteristics that satisfy the initial networking connectivity requirement (or the initial networking connectivity requirement range) for multiple applications that have been grouped in an application container as discussed above. As discussed in further detail below, a plurality of network slices may be identified that include initial networking characteristics that satisfy the initial networking connectivity requirement for an application via an identification that an aggregation of the networking characteristics of those network slices will satisfy the initial networking connectivity requirement for that application.

As will be appreciated by one of skill in the art in possession of the present disclosure, the identification of at least one of the network slices 600a, 602a, 604a, and 604b that include initial networking characteristics that satisfy the initial networking connectivity requirement for any particular application operating on the endpoint computing device 206a/300 may include the identification of one or more network slices that include initial networking characteristics that are closest to that initial networking connectivity requirement, that fall within some range of that initial networking connectivity requirement, and/or that one of skill in the art in possession of the present disclosure would recognize make those one or more network slices the most desirable subset of the network slices that are available to the endpoint computing device 206a/300 for providing that connection for that application. Furthermore, one of skill in the art in possession of the present disclosure will appreciate that situations may arise in which no combination of network slices are available that include initial networking characteristics that satisfy the initial network connectivity requirement of an application and, in such situations, one or more network slices that include initial networking characteristics that most closely satisfy the initial networking connectivity requirements of that application may be identified for providing the connection for that application.

In some embodiments, the network slice engine 304 in the endpoint computing device 206a/300 may be configured to request one or more network slices with initial networking characteristics that satisfy the initial networking connectivity requirement of an application detected to block 402. For example, after determining the initial networking connectivity requirement for an application at block 404, the network slice engine 304 in the endpoint computing device 206a/300 may transmit a network slice request communication via the RAN system 204 to the core network system 202 (e.g., via an available connection to the core network system 202 that may have been previously established using conventional techniques and/or the techniques described herein), with that network slice request communication providing a request to allocate one or more network slices having initial networking characteristics that satisfy the initial network connectivity requirement of the application, and make those one or more network slices available via the RAN system 204. As such, the core network system 202 may receive that network slice request and, in response, may allocate one or more network slices having the requested initial network connectivity requirements, and make those one or more network slices available via the RAN system 204 so that the network slice engine 304 in the endpoint computing device 206a/300 may identify those one or more network slices at block 406.

The method 400 then proceeds to block 408 where the endpoint computing device establishes one or more connections for the detected application with each of the one or more network slices identified for that application. In an embodiment, at block 408, the network slice engine 304 in the endpoint computing device 206a/300 may operate to establish one or more connection(s) for the application operating on the endpoint computing device 206a/300 with the respective network slice(s) that were identified at block 406 as including initial networking characteristics that satisfy the initial networking connectivity requirements of that application. For example, at block 408, the network slice engine 304 in the endpoint computing device 206a/300 may, for the application for which it identified the one or more network slices at block 406, present that application as a virtual endpoint computing device in network slice connection communications exchanged with the RAN system 204, with the network slice communications operating to establish one or more connection(s) between that application and the respective network slice(s) that were identified for that application at block 406. As will be appreciated by one of skill in the art in possession of the present disclosure, the network slice communications and/or establishment of the connection(s) between the network slice(s) and the application that is presented as a virtual endpoint computing device may be similar to conventional network slice/physical endpoint device communications and/or connection establishment, with the exception of the application being presented as a virtual endpoint computing device in the network slice connection communications and/or connection establishment, and thus are not described herein in detail.

Figure 6C:
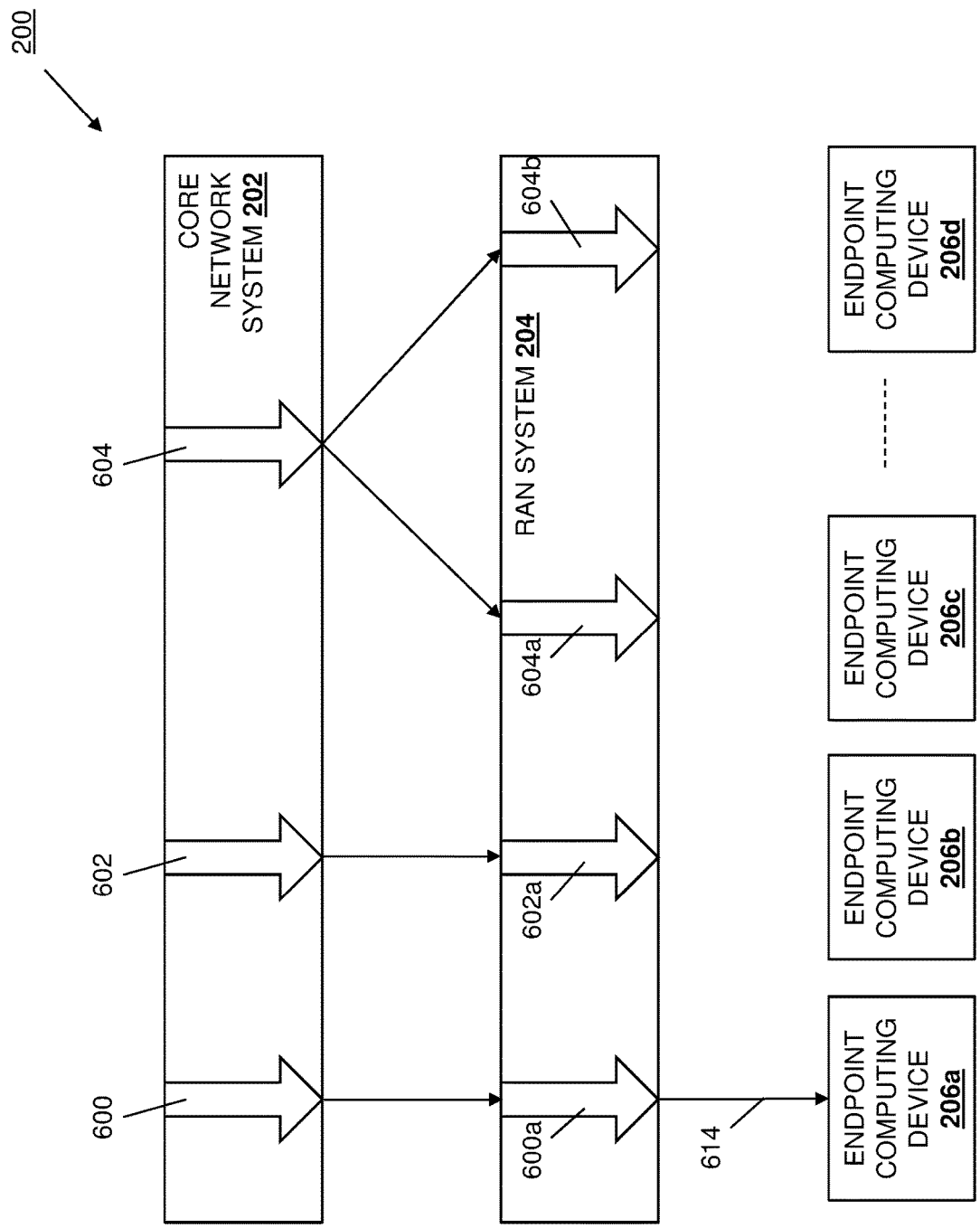
FIG. 6C is a schematic view illustrating an embodiment of the endpoint computing device dynamic network slice utilization system of FIG. 2 operating during the method of FIG. 4.
Figure 6D:
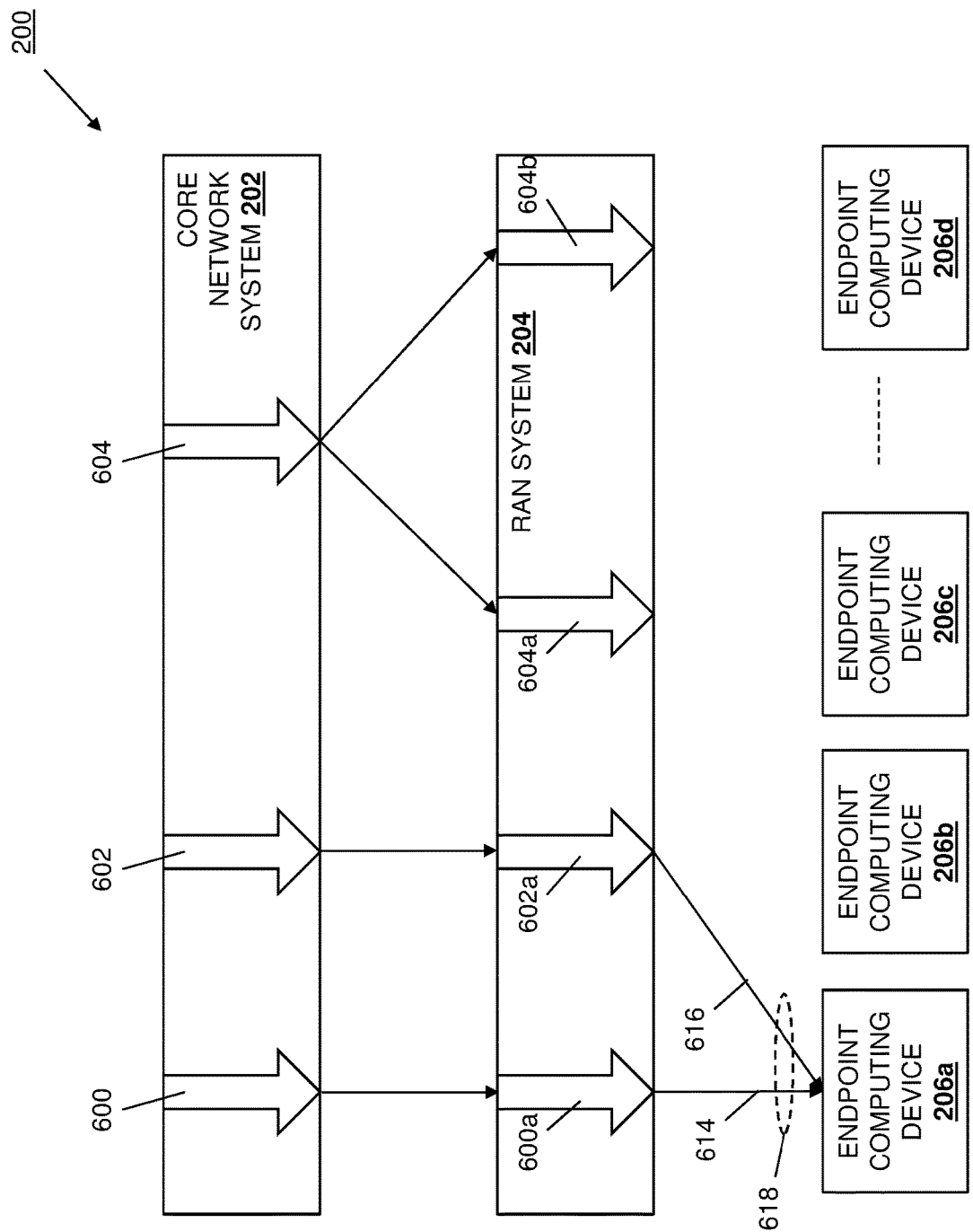
FIG. 6D is a schematic view illustrating an embodiment of the endpoint computing device dynamic network slice utilization system of FIG. 2 operating during the method of FIG. 4.

As such, with reference to FIG. 6C, in some embodiments of block 408, the network slice engine 304 in the endpoint computing device 206a/300 may establish a connection 614 for an application operating on the endpoint computing device 206a with the network slice 600a that was identified as having initial networking characteristics that satisfy the initial networking connectivity requirements determined for the application. However, with reference to FIG. 6D, in some embodiments of block 408, the network slice engine 304 in the endpoint computing device 206a/300 may establish the connection 614 along with a connection 616 for the application operating on the endpoint computing device 206a with the network slices 600a and 602a, respectively, that were identified as having initial networking characteristics that satisfy the initial networking connectivity requirements determined for the application. The illustrated embodiment of FIG. 6D provides an example of how the network slice engine 304 in the endpoint computing device 206a/300 may aggregate the connections 614 and 616 into an aggregated connection 618 that allows the connections 614 and 616 to be viewed and/or utilized as a single, logical connection by the application. One of skill in the art in possession of the present disclosure will recognize that the aggregation of connections to respective network slices may be performed utilizing a variety of connection/link aggregation techniques known in the art, and thus those aggregation operations are not discussed herein in detail.

Figure 6E:
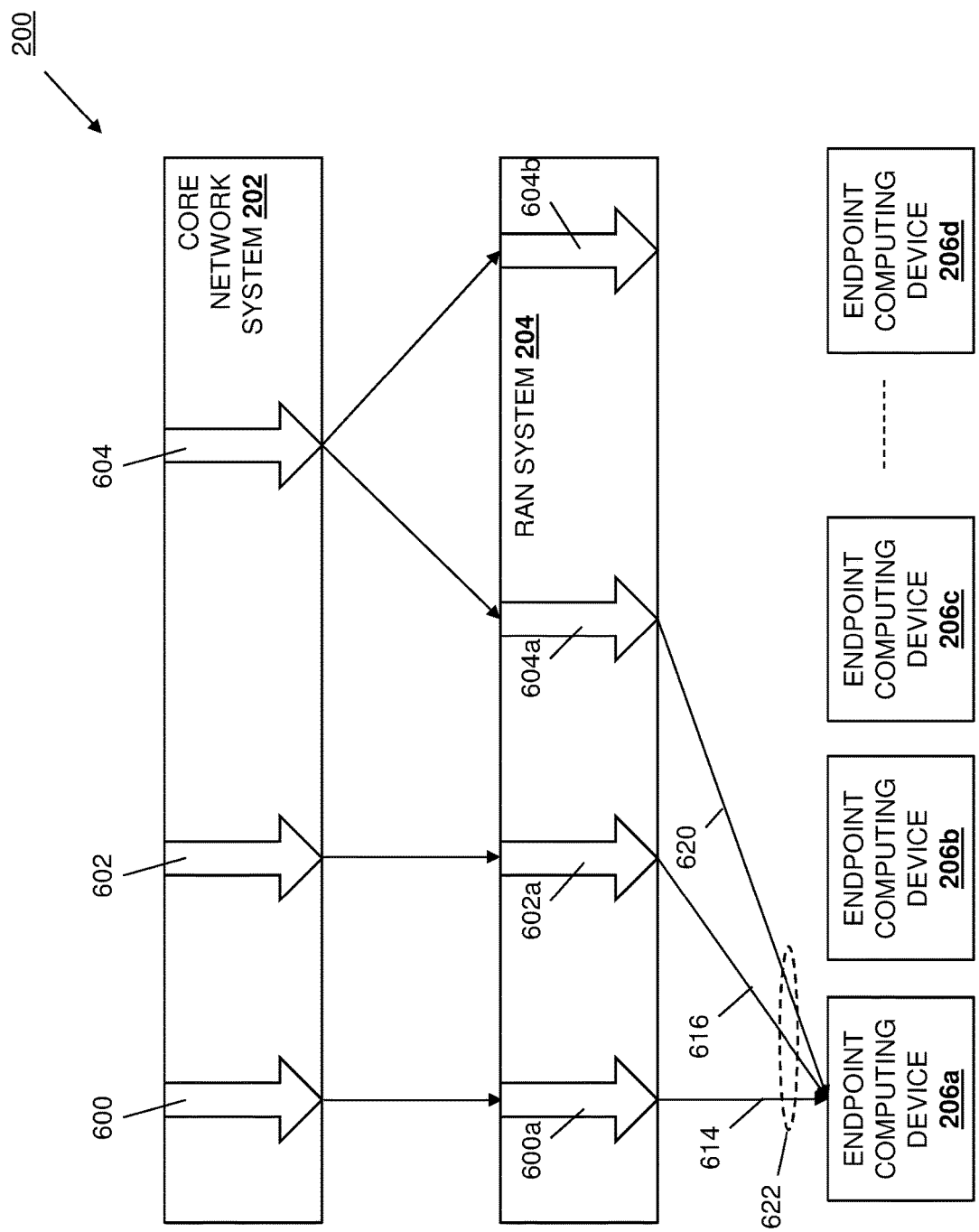
FIG. 6E is a schematic view illustrating an embodiment of the endpoint computing device dynamic network slice utilization system of FIG. 2 operating during the method of FIG. 4.

Furthermore, with reference to FIG. 6E, in some embodiments of block 408, the network slice engine 304 in the endpoint computing device 206a/300 may establish the connections 614 and 616, along with a connection 620 for the application operating on the endpoint computing device 206a with the network slices 600a, 602a, and 604a, respectively, that were identified as having initial networking characteristics that satisfy the initial networking connectivity requirements determined for the application. The illustrated embodiment of FIG. 6E provides an example of how the network slice engine 304 in the endpoint computing device 206a/300 may aggregate the connections 614, 616, and 620 into an aggregated connection 622 that allows the connections 614, 616, and 620 to be viewed and/or utilized as a single, logical connection by the application. Similarly as discussed above, one of skill in the art in possession of the present disclosure will recognize that the aggregation of connections to respective network slices may be performed utilizing a variety of connection/link aggregation techniques known in the art, and thus those aggregation operations are not discussed herein in detail. As such, multiple network slices may be identified as having combined initial networking characteristics that satisfy the initial networking connectivity requirement for an application, and connections to those network slices may be established and aggregated to provide an aggregated connection with initial networking characteristics that satisfy the initial networking connectivity requirement for that application. While not illustrated, as discussed above one of skill in the art in possession of the present disclosure will appreciate that connections with multiple network slices for any particular application operating on any or all of the endpoint computing devices 206b-206c may be established in a similar manner while remaining within the scope of the present disclosure as well.

Furthermore, in some embodiments, at block 408 the network slice engine 304 in the endpoint computing device 206a/300 may establish connection(s) for any particular application subsystem, workload subsystem, and/or functionality subsystem included in an application, workload, or functionality with respective network slice(s) that include initial networking characteristics that satisfy its initial networking connectivity requirement (e.g., establishing one or more connections with respective network slice(s) including first initial networking characteristics that satisfy a first initial networking connectivity requirement for a first application subsystem included in an application operating on the endpoint computing device 206a/300, establishing one or more connections with respective network slice(s) including second initial networking characteristics that satisfy a second initial networking connectivity requirement for a second application subsystem included in that application operating on the endpoint computing device 206a/300, and so on). Further still, in some embodiments, at block 408 the network slice engine 304 in the endpoint computing device 206a/300 may establish one or more connections with respective network slice(s) that include initial networking characteristics that satisfy the initial networking connectivity requirement (or an initial networking connectivity requirement range) for multiple applications that have been grouped in an application container. As such, one of skill in the art in possession of the present disclosure will appreciate that any single endpoint computing device may appear to the RAN system 204 and/or the core network system 202 as many (e.g., tens, hundreds, or more) endpoint computing devices due to the many applications operating on that single endpoint computing device being presented as respective virtual endpoint computing devices.

The method 400 then proceeds to block 410 where the endpoint computing device exchanges communications for the detected application during the application session using the connection(s) with the network slice(s). In an embodiment, at block 410, communications may be exchanged for the application using the one or more connections established with the respective network slice(s) that satisfies its initial networking connectivity requirement. As such, with reference to FIG. 6C, at block 410, the network slice engine 304 in the endpoint computing device 206a/300 may utilize its communication system 308 to exchange communications via the connection 614 with the network slice 600a for the application operating on the endpoint computing device 206a (e.g., with a device coupled to the RAN system 204, a device coupled to the core network system 202 via a network, etc.) Similarly, with reference to FIG. 6D, at block 410, the network slice engine 304 in the endpoint computing device 206a/300 may utilize its communication system 308 to exchange communications via the aggregated connection 618 (including the connections 614 and 616) with the network slices 600a and 602a for the application operating on the endpoint computing device 206a (e.g., with a device coupled to the RAN system 204, a device coupled to the core network system 202 via a network, etc.) Similarly as well, with reference to FIG. 6E, at block 410, the network slice engine 304 in the endpoint computing device 206a/300 may utilize its communication system 308 to exchange communications via the aggregated connection 622 (including the connections 614, 616, and 620) with the network slices 600a, 602a, and 604a for the application operating on the endpoint computing device 206a (e.g., with a device coupled to the RAN system 204, a device coupled to the core network system 202 via a network, etc.) As will be appreciated by one of skill in the art in possession of the present disclosure, the exchange of communications via a connection or aggregated connection with network slice(s) at block 410 may be similar to conventional network slice communication exchanges, with the exception of that the application operating on the endpoint computing device 206a/300 may be exchanging communications via the one or more connections with their respective network slices that include initial networking characteristics that satisfy the initial networking connectivity requirements of those applications. As discussed below, each of the network slices provided by the core network system 202 are isolated from each other and, as such, any application or workload that is operating on an endpoint computing device and that is utilizing a particular network slice will be unaware of the other networks available via the other network slices being utilized by other applications or workloads operating on that same endpoint computing device.

Furthermore, in some embodiments, at block 408 the network slice engine 304 in the endpoint computing device 206a/300 may operate to exchange communications for an application subsystem, workload subsystem, and/or functionality subsystem included in an application, workload, or functionality via one or more connections provided with respective network slices (e.g., exchanging communications via one or more connections with respective network slice(s) for a first application subsystem included in an application operating on the endpoint computing device 206a/300, exchanging communications via one or more connections with respective network slice(s) for a second application subsystem included in that application operating on the endpoint computing device 206a/300, and so on). Further still, in some embodiments, at block 408 the network slice engine 304 in the endpoint computing device 206a/300 may exchange communications via one or more connections with respective network slice(s) for multiple applications that have been grouped in an application container as discussed above.

The method 400 then proceeds to decision block 412 where it is determined whether the networking connectivity requirement for the application has changed during the application session. In an embodiment, the operating system engine 306 in the endpoint computing device 206a/300 (e.g., an OS level/Layer 3 (L3) engine provided as a WINDOWS® service on a WINDOWS® operating system available from MICROSOFT® of Redmond, Wash., United States) may operate to monitor the application being provided by the application engine(s) 305 to determine whether the initial networking connectivity requirement determined at block 404 has changed during the application session (e.g., to a "changed" network connectivity requirement) at decision block 412. As discussed above, some applications may have network connectivity requirements that change during an application session, and the operating system engine 306 may be configured to monitor the operation of the applications, identify a network connectivity requirement change, and report that network connectivity requirement change to the network slice engine 304 in the endpoint computing device 206a/300 at decision block 412. In an embodiment, if it is determined that the networking connectivity requirement for the application has changed during the application session, the method 400 may return to block 406, discussed in further detail below.

In an embodiment, if it is determined that the networking connectivity requirement for the application has not changed during the application session, the method 400 may proceed to decision block 414 where it is determined whether networking characteristic(s) for the network slice(s) being utilized by the application have changed during the application session. In an embodiment, the network slice engine 304 in the endpoint computing device 206a/300 may operate to monitor the network slice(s) being utilized by the application (e.g., using the network characteristic determination techniques discussed above) to determine whether the initial networking characteristics of the network slice(s) identified at block 406 have changed during the application session (e.g., to "changed" network characteristics) at decision block 414. As discussed above, some network slices may have network characteristics that change during an application session, and the network slice engine 304 may be configured to monitor the network slice(s), and identify a network characteristic change of any or all of those network slice(s). In an embodiment, if it is determined that the networking characteristics for the one or more network slice(s) being utilized by the application during the application session has not changed, the method 400 may return to block 410, and the method 400 may loop with the endpoint computing device exchanging communications for the application during the application session using the connection(s) to the respective network slice(s).

In an embodiment, if it is determined that the networking connectivity requirement for the application has changed during the application session and/or that the networking characteristics for one or more network slice(s) has changed during the application session, the method 400 may return to block 406 where the endpoint computing device identifies at least one network slice that satisfies the networking connectivity requirement for the application, proceed to block 408 where the endpoint computing device establishes connection(s) for the application with each at least one network slice that satisfies its network connectivity requirement, and block 410 where the endpoint computing device exchanges communications for the application during the application session using the connection(s) to the network slice(s), as well as to decision blocks 412 and 414.

As will be appreciated by one of skill in the art in possession of the present disclosure, the performance of block 406 may depend on the details of the change in the networking connectivity requirements for the application and/or the change in the networking characteristics of the network slice(s) determined at decision blocks 412 and/or 414. For example, networking connectivity requirement changes for the application and/or networking characteristic changes of the network slice(s) may be required to exceed some predetermined level and/or cause some degradation in performance of the application in order for their determination at decision blocks 412 and 414 to cause the method 400 to return to block 406. As such, relatively minor changes in networking connectivity requirements for the application and/or networking characteristics of the network slice(s) may be ignored by the network slice engine 304 in the endpoint computing device 206a/300, and cause the method 400 to return to block 410 as discussed above.

However, as will be appreciated by one of skill in the art in possession of the present disclosure, networking connectivity requirement changes for the application and/or networking characteristic changes of the network slice(s) utilized by that application may reach a level at which the performance of the application is reduced, and thus such changes may require the identification of at least one additional and/or different network slice for that application. For example, with reference to FIGS. 6C and 6D, on a first iteration of the method 400 the connection 614 may be established between the application operating on the endpoint computing device 206a/300 with the network slice 600a that includes initial networking characteristics that satisfy the initial networking connectivity requirement for that application. Subsequently, at decision blocks 412 and/or 414, changes in networking connectivity requirements for the application (e.g., a requirement of reduced latency, increased bandwidth, etc.) and/or networking characteristics of the network slice 600a (e.g., increased latency, reduced bandwidth, etc.) may be determined by the network slice engine 304 in the endpoint computing device 206a/300, and a second iteration of the method 400 may identify the network slice 602a as including networking characteristics that, when combined with the networking characteristics of the network slice 600a, satisfy the networking connectivity requirements for the application. As such, the connection 616 for the application to the network slice 602a may be established and aggregated with the connection 614 for the application to the network slice 600a to provide the aggregated connection 618 during the second iteration of the method 400 that satisfies the networking connectivity requirements for the application.

In another example, with reference to FIGS. 6D and 6E, on a first iteration of the method 400 the connections 614 and 616 may be established and aggregated to provide the aggregated connection 622 between the application operating on the endpoint computing device 206a/300 with the network slices 600a and 602a that includes initial networking characteristics that satisfy the initial networking connectivity requirement for that application. Subsequently, at decision blocks 412 and/or 414, changes in networking connectivity requirements for the application (e.g., a requirement of reduced latency, increased bandwidth, etc.) and/or networking characteristics of the network slices 600a and/or 602a (e.g., increased latency, reduced bandwidth, etc.) may be determined by the network slice engine 304 in the endpoint computing device 206a/300, and a second iteration of the method 400 may identify the network slice 604a as including networking characteristics that, when combined with the networking characteristics of the network slices 600a and 600b, satisfy the networking connectivity requirements for the application. As such, the connection 620 for the application to the network slice 604a may be established and aggregated with the connections 614 and 616 for the application to the network slices 600a and 602a to provide the aggregated connection 622 during the second iteration of the method 400 that satisfies the networking connectivity requirements for the application.

Figure 6F:
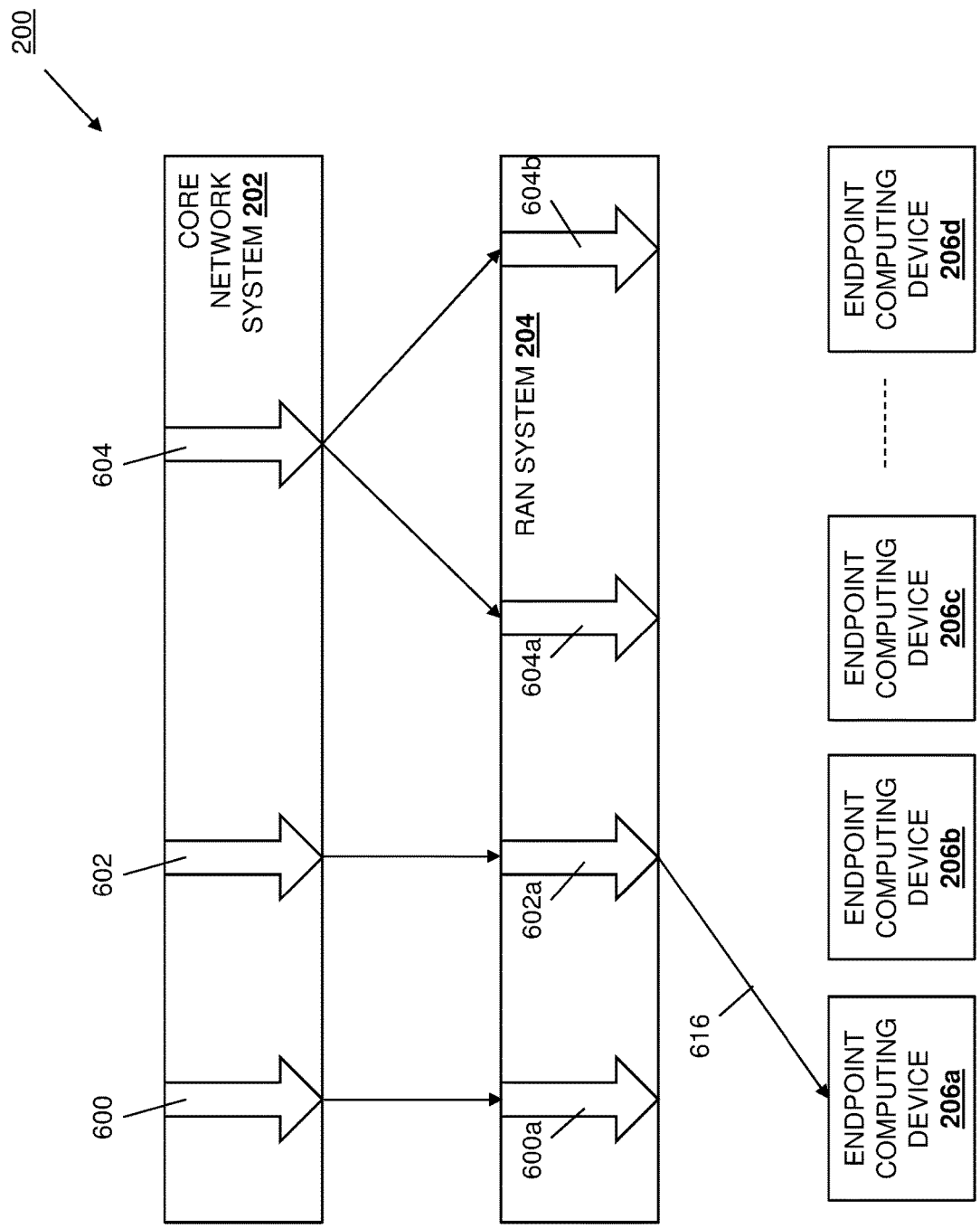
FIG. 6F is a schematic view illustrating an embodiment of the endpoint computing device dynamic network slice utilization system of FIG. 2 operating during the method of FIG. 4.

In yet another example, with reference to FIGS. 6C and 6F, on a first iteration of the method 400 the connection 614 may be established between the application operating on the endpoint computing device 206a/300 with the network slice 600a that includes initial networking characteristics that satisfy the initial networking connectivity requirement for that application. Subsequently, at decision blocks 412 and/or 414, changes in networking connectivity requirements for the application (e.g., a requirement of increased latency, reduced bandwidth, etc.) and/or networking characteristics of the network slice 600a (e.g., decreased latency, increased bandwidth, etc.) may be determined by the network slice engine 304 in the endpoint computing device 206a/300, and a second iteration of the method 400 may identify the network slice 602a as including networking characteristics that satisfy the networking connectivity requirements for the application. As such, the connection 616 for the application to the network slice 602a may be established and the connection 614 for the application to the network slice 600a may be ended during the second iteration of the method 400 in order to satisfy the networking connectivity requirements for the application.

Figure 6G:
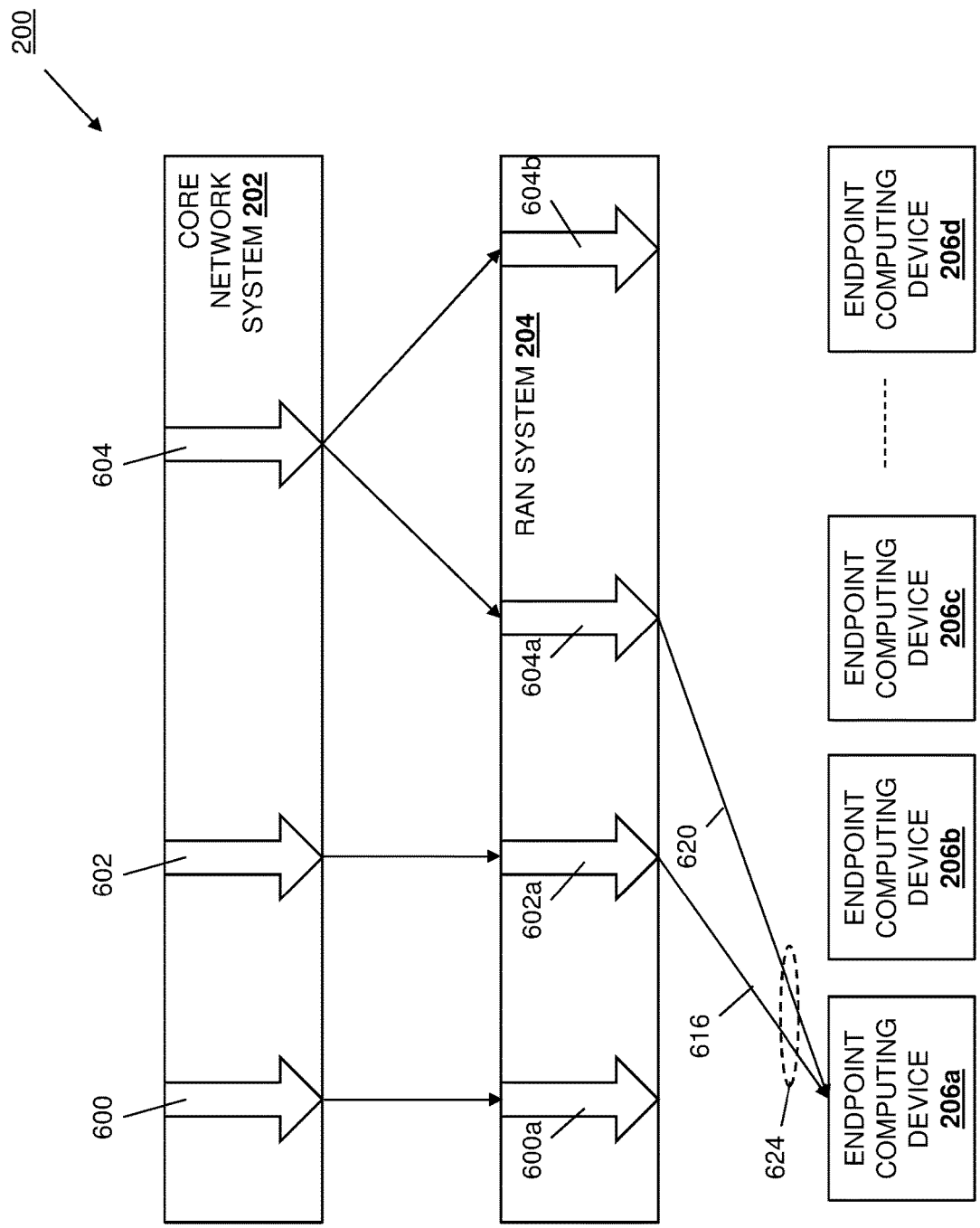
FIG. 6G is a schematic view illustrating an embodiment of the endpoint computing device dynamic network slice utilization system of FIG. 2 operating during the method of FIG. 4.

In yet another example, with reference to FIGS. 6C and 6G, on a first iteration of the method 400 the connection 614 may be established between the application operating on the endpoint computing device 206a/300 with the network slice 600a that includes initial networking characteristics that satisfy the initial networking connectivity requirement for that application. Subsequently, at decision blocks 412 and/or 414, changes in networking connectivity requirements for the application (e.g., a requirement of increased latency, reduced bandwidth, etc.) and/or networking characteristics of the network slice 600a (e.g., decreased latency, increased bandwidth, etc.) may be determined by the network slice engine 304 in the endpoint computing device 206a/300, and a second iteration of the method 400 may identify the network slices 602a and 604a as including networking characteristics that satisfy the networking connectivity requirements for the application. As such, the connections 616 and 620 for the application to the network slices 602a and 604a may be established and the connection 614 for the application to the network slice 600a may be ended during the second iteration of the method 400 in order to satisfy the networking connectivity requirements for the application.

While a few specific examples have been provided, one of skill in the art in possession of the present disclosure will appreciate the many ways in which connections to respective network slices may be replaced, added, removed, and/or aggregated for any particular application to satisfy the changing networking connectivity requirements of that application and/or the changing networking characteristics of those network slice(s). Furthermore, one of skill in the art in possession of the present disclosure will appreciate how the method 400 may loop to continuously monitor the networking connectivity requirements of the application and networking characteristic of the network slice(s) being utilized by that application to detect changes and modify the network slice connectivity for that application to ensure that its networking connectivity requirements are satisfied efficiently and without the allocation of network slices to that application that are not needed by that application.

In embodiments in which connections to multiple network slices are aggregated to provide an aggregated connection that is utilized by an application (examples of which are illustrated in FIGS. 6D, 6E, and 6G), the network slice engine 304 in the endpoint computing device 206a/300 may operate to tag data packets or frames that are transmitted via the aggregated connection, with those tags configured for use by the core network system 202 to order those data packets or frames in a desired sequence. As will be appreciated by one of skill in the art in possession of the present disclosure, when a plurality of network slices are utilized by an application, those network slices may have different networking characteristics that can result in data packets or frames transmitted by the application being received at the core network system 202 out of sequence. For example, when the application utilizes a first network slice to transmit a first data packet that is first in a sequence, a second network slice to transmit a second data packet that is second in the sequence, and a third network slice to transmit a third data packet that is third in the sequence, the first, second, and third data packets may be transmitted in parallel and may be received by the core network system 202 out of sequence due to the different networking characteristics of the first, second, and third network slice (e.g., the core network system 202 may first receive the third data packet, followed by the first data packet, followed by the second data packet.) As such, the data packet tagging operation discussed above may provide tags with each of the first, second, and third data packets that allow the core network system 202 receiving them to utilize the tags to provide them in their desired sequence despite receiving them out of sequence.

Furthermore, in embodiments in which connections to multiple network slices are aggregated to provide an aggregated connection that is utilized by an application (examples of which are illustrated in FIGS. 6D, 6E, and 6G), the network slice engine 304 in the endpoint computing device 206a/300 may operate to load-balance data packets or frames transmitted over respective connections to respective network slices based on the differing networking characteristics of those network slices. For example, when a first, second, and third network slice are utilized by an application via respective connections that have been aggregated to provide an aggregated connection, and the first network slice includes relatively higher latency networking characteristics compared to the second and third network slices, the increased latency associated with the first network slice may be mitigated by load-balancing data packets transmitted via the aggregated connection by, for example, transmitting fewer data packet over the connection to the first network slice as compared to the second and third connections to the second and third network slices, respectively. However, while a latency networking characteristic has been described, one of skill in the art in possession of the present disclosure will appreciate that the load balancing operations discussed above may be performed to mitigate or otherwise address any of a variety of QoS discrepancies or differences between network slices utilized by an application while remaining within the scope of the present disclosure.

As will be appreciated by one of skill in the art in possession of the present disclosure, the method 400 may be performed to provide for the dynamic utilization of network slices by an application until that application is unavailable. For example, the application, workload, or other functionality operating on the endpoint computing device and to which connection(s) to network slice(s) were established during the method 400 may complete, be shut down, and/or may otherwise become unavailable in a manner that does not utilize the network slice(s) with which that application, workload, or other functionality was connected at block 408. As such, the network slice engine 304 in the endpoint computing device 206*a*/300 may operate to continuously or periodically to monitor the application (or application subsystem in an application, or applications grouped in an application container) for which connection(s) with network slice(s) were provided at block 408 to determine whether that application (or application subsystem) has become unavailable or is otherwise not utilizing the network slice(s) to which it was connected. In the event it is determined that the application is not available, the endpoint computing device 206/300 may end the connection(s) with the network slice(s) for that application, and release those network slice(s) for use by other applications and/or endpoint computing devices. As will be appreciated by one of skill in the art in possession of the present disclosure, the ending of a connection with any network slice may be similar to conventional connection ending operations, and thus is not described herein in detail.

In some embodiments, repeated performance of the method 400 may allow the network slice engine 304 in the endpoint computing devices 300 to perform intelligent network slice operations based on learned behavior of any application operating on the endpoint computing device 300. For example, the network slice engine 304 in the endpoint computing device 300 may monitor the use of an application on the endpoint computing device 300, the time of such application use on the endpoint computing device 300, locations of the endpoint computing device 300, and/or any other information that would be apparent to one of skill in the art in possession of the present disclosure, and may subsequently utilize that information to reserve network slices that include networking characteristics that satisfy the networking connectivity requirements of any particular applications. As such, when an endpoint computing device repeatedly operates a particular application at a particular time and in a particular location that utilizes particular network slice(s) that include networking characteristics that satisfy its networking connectivity requirements, the network slice engine 304 in the endpoint computing device 300 may learn that behavior and subsequently operate to reserve those network slice(s) at the learned reoccurring application use time for use by the learned application in the learned location. However, while a specific intelligent network slice operation is described, one of skill in the art in possession of the present disclosure will recognize that other intelligent network slice operations may be performed that will fall within the scope of the present disclosure as well.

Thus, systems and methods have been described that provide for the dynamic utilization of one or more network slices by any particular functionality (e.g., any particular application, workload, etc.) provided on any particular endpoint computing device. For example, a 5G core network system that is coupled to a 5G RAN system may allocate a plurality of a network slices and make each of the plurality of network slices available for use in wireless communications via the 5G RAN system. An endpoint computing device with an application operating on that endpoint computing device may determine an initial networking connectivity requirement for the application during an application session, identify a first network slice that is included in the plurality of network slices and that satisfies the initial networking connectivity requirement for the application, establish a first connection for the application with the first network slice, and exchange communications via the RAN system and the core network system for the application during the application session using the first connection established for the application with the first network slice. Subsequently, the endpoint computing device may determine a changed networking connectivity requirement for the application during the application session that is different than the initial networking connectivity requirement, identify a second network slice that is included in the plurality of network slices and that satisfies the changed networking connectivity requirement for the application, establish a second connection for the application with the second network slice, and exchange communications via the 5G RAN system and the 5G core network system for the application during the application session using the second connection established for the application with the second network slice. As such, any particular application, workload, or other functionality operating on a computing device may dynamically utilize one or more network slices as the networking requirements of that application, workload, or other functionality changes, and/or the networking characteristics of network slices being utilized by that application, workload, or other functionality changes.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An endpoint computing device dynamic network slice utilization system, comprising:
 a Radio Access Network (RAN) system;
 a core network system that is coupled to the RAN system and that is configured to allocate a plurality of a network slices and make each of the plurality of network slices available for use in wireless communications via the RAN system; and
 an endpoint computing device that includes an application that is configured to operate on the endpoint computing device, wherein the endpoint computing device is configured to:
 determine a first networking connectivity requirement for the application during an application session;
 identify a first network slice that is included in the plurality of network slices and that satisfies the first networking connectivity requirement for the application;
 establish a first connection for the application with the first network slice;
 exchange communications via the RAN system and the core network system for the application during the application session using the first connection established for the application with the first network slice;

determine a second networking connectivity requirement for the application during the application session that is different than the first networking connectivity requirement;

identify a second network slice that is included in the plurality of network slices and that satisfies the second networking connectivity requirement for the application;

establish a second connection for the application with the second network slice;

exchange communications via the RAN system and the core network system for the application during the application session using the second connection established for the application with the second network slice;

determine a third networking connectivity requirement for the application during the application session that is different than the first networking connectivity requirement and the second networking connectivity requirement;

identify a third network slice that is included in the plurality of network slices and that satisfies the third networking connectivity requirement for the application;

establish a third connection for the application with the second network slice; and exchange communications via the RAN system and the core network system for the application during the application session using the third connection established for the application with the third network slice.

2. The system of claim 1, wherein the endpoint computing device is configured to:

aggregate the first connection established for the application with the network slice and the second connection established for the application with the network slice to provide an aggregated connection for the application with both the first network slice and the second network slice; and exchange communications via the RAN system and the core network system for the application during the application session using the aggregated connection.

3. The system of claim 2, wherein the endpoint computing device is configured to:

tag first data traffic exchanged via the RAN system and the core network system for the application during the application session using the first connection included in the aggregated connection with first identification tag information; and tag second data traffic exchanged via the RAN system and the core network system for the application during the application session using the second connection included in the aggregated connection with second identification tag information, wherein the first identification tag information and the second identification tag information is configured to allow the first data traffic and the second data traffic to be provided in a predetermined sequence at the core network system.

4. The system of claim 2, wherein the endpoint computing device is configured to:

identify first networking characteristics for the first network slice;

identify second networking characteristics for the second network slice; and load-balance the exchange of communications via the RAN system and the core network system for the application during the application session using the first connection and the second connection included in the aggregated connection using the first networking characteristics and the second networking characteristics.

5. The system of claim 1, wherein the endpoint computing device is configured to:

end, in response to establishing the second connection for the application with the second network slice, the first connection for the application with the first network slice.

6. An Information Handling System (IHS), comprising:

a processing system; and a memory system that is coupled to the processing system and that includes instructions that, when executed by the processing system, cause the processing system to provide a network slice engine that is configured to:

determine a first networking connectivity requirement for an application during an application session;

identify a first network slice that is included in a plurality of network slices that are allocated by a core network system, that is available via a Radio Access Network (RAN) system, and that satisfies the first networking connectivity requirement for the application;

establish a first connection for the application with the first network slice; exchange communications via the RAN system and the core network system for the application during the application session using the first connection established for the application with the first network slice;

determine a second networking connectivity requirement for the application during the application session that is different than the first networking connectivity requirement;

identify a second network slice that is included in the plurality of network slices that are allocated by the core network system, that is available via the RAN system, and that satisfies the second networking connectivity requirement for the application;

establish a second connection for the application with the second network slice; and exchange communications via the RAN system and the core network system for the application during the application session using the second connection established for the application with the second network slice;

determine a third networking connectivity requirement for the application during the application session that is different than the first networking connectivity requirement and the second networking connectivity requirement;

identify a third network slice that is included in the plurality of network slices that are allocated by the core network system, that is available via the RAN system, and that satisfies the third networking connectivity requirement for the application;

establish a third connection for the application with the second network slice; and exchange communications via the RAN system and the core network system for the application during the application session using the third connection established for the application with the third network slice.

7. The IHS of claim 6, wherein network slice engine is configured to:

aggregate the first connection established for the application with the network slice and the second connection established for the application with the network slice to provide an aggregated connection for the application with both the first network slice and the second network slice; and exchange communications via the RAN system and the core network system for the application during the application session using the aggregated connection.

8. The IHS of claim 6, wherein network slice engine is configured to:
tag first data traffic exchanged via the RAN system and the core network system for the application during the application session using the first connection included in the aggregated connection with first identification tag information; and
tag second data traffic exchanged via the RAN system and the core network system for the application during the application session using the second connection included in the aggregated connection with second identification tag information, wherein the first identification tag information and the second identification tag information is configured to allow the first data traffic and the second data traffic to be provided in a predetermined sequence at the core network system.

9. The IHS of claim 8, wherein network slice engine is configured to:
identify first networking characteristics for the first network slice;
identify second networking characteristics for the second network slice; and
load-balance the exchange of communications via the RAN system and the core network system for the application during the application session using the first connection and the second connection included in the aggregated connection using the first networking characteristics and the second networking characteristics.

10. The IHS of claim 6, wherein network slice engine is configured to:
end, in response to establishing the second connection for the application with the second network slice, the first connection for the application with the first network slice.

11. The IHS of claim 6, wherein the memory system includes instructions that, when executed by the processing system, cause the processing system to provide an Operating System engine that is configured to:
identify and report the first networking connectivity requirement for the application during the application session to the network slice engine; and
identify and report the second networking connectivity requirement for the application during the application session to the network slice engine.

12. A method for dynamically utilizing network slices by an endpoint computing device, comprising:
determining, by an endpoint computing device, a first networking connectivity requirement for an application during an application session;
identifying, by the endpoint computing device, a first network slice that is included in a plurality of network slices that are allocated by a core network system, that is available via a Radio Access Network (RAN) system, and that satisfies the first networking connectivity requirement for the application;
establishing, by the endpoint computing device, a first connection for the application with the first network slice;
exchanging, by the endpoint computing device, communications via the RAN system and the core network system for the application during the application session using the first connection established for the application with the first network slice;

determining, by the endpoint computing device, a second networking connectivity requirement for the application during the application session that is different than the first networking connectivity requirement;
identifying, by the endpoint computing device, a second network slice that is included in the plurality of network slices that are allocated by the core network system, that is available via the RAN system, and that satisfies the second networking connectivity requirement for the application;
establishing, by the endpoint computing device, a second connection for the application with the second network slice; and
exchanging, by the endpoint computing device, communications via the RAN system and the core network system for the application during the application session using the second connection established for the application with the second network slice;
determining, by the endpoint computing device, a third networking connectivity requirement for the application during the application session that is different than the first networking connectivity requirement and the second networking connectivity requirement;
identifying, by the endpoint computing device, a third network slice that is included in the plurality of network slices that are allocated by the core network system, that is available via the RAN system, and that satisfies the third networking connectivity requirement for the application;
establishing, by the endpoint computing device, a third connection for the application with the second network slice; and
exchanging, by the endpoint computing device, communications via the RAN system and the core network system for the application during the application session using the third connection established for the application with the third network slice.

13. The method of claim 12, further comprising:
aggregating, by the endpoint computing device, the first connection established for the application with the network slice and the second connection established for the application with the network slice to provide an aggregated connection for the application with both the first network slice and the second network slice; and
exchanging, by the endpoint computing device, communications via the RAN system and the core network system for the application during the application session using the aggregated connection.

14. The method of claim 12, further comprising:
tagging, by the endpoint computing device, first data traffic exchanged via the RAN system and the core network system for the application during the application session using the first connection included in the aggregated connection with first identification tag information; and
tagging, by the endpoint computing device, second data traffic exchanged via the RAN system and the core network system for the application during the application session using the second connection included in the aggregated connection with second identification tag information, wherein the first identification tag information and the second identification tag information is configured to allow the first data traffic and the second data traffic to be provided in a predetermined sequence at the core network system.

15. The method of claim 12, further comprising:
identifying, by the endpoint computing device, first networking characteristics for the first network slice;
identifying, by the endpoint computing device, second networking characteristics for the second network slice; and
load-balancing, by the endpoint computing device, the exchange of communications via the RAN system and the core network system for the application during the application session using the first connection and the second connection included in the aggregated connection using the first networking characteristics and the second networking characteristics.

16. The method of claim 12, further comprising:
ending, by the endpoint computing device in response to establishing the second connection for the application with the second network slice, the first connection for the application with the first network slice.

17. The method of claim 12, further comprising:
identifying and reporting, by an operating system engine to a network slice engine in the endpoint computing device, the first networking connectivity requirement for the application during the application session to the network slice engine; and
identifying and reporting, by the operating system engine to the network slice engine in the endpoint computing device, the second networking connectivity requirement for the application during the application session to the network slice engine.

\* \* \* \* \*